United States Patent [19]

Eberle et al.

[11] 4,249,180
[45] Feb. 3, 1981

[54] PAST DEPENDENT MICROCOMPUTER CIPHER APPARATUS

[75] Inventors: Gernot Eberle, Alymer; Anthony R. Walker, Stittsville; William Goodchild, Ottawa; Patrice L. D. Humbert-Droz, Ottawa, all of Canada

[73] Assignee: Northern Telecom Limited, Montreal, Canada

[21] Appl. No.: 943,765

[22] Filed: Sep. 20, 1978

[51] Int. Cl.³ .............................................. H04L 9/02
[52] U.S. Cl. ....................................................... 375/2
[58] Field of Search ............................... 178/22; 375/2

[56] References Cited

U.S. PATENT DOCUMENTS

| | | | |
|---|---|---|---|
| 3,657,699 | 4/1972 | Rocher et al. | 178/22 |
| 4,078,152 | 3/1978 | Tuckerman III | 178/22 |
| 4,095,046 | 6/1978 | Frutiger et al. | 178/22 |
| 4,120,030 | 10/1978 | Johnstone | 178/22 |
| 4,157,454 | 6/1979 | Becker | 178/22 |
| 4,160,120 | 7/1979 | Barnes et al. | 178/22 |
| 4,168,396 | 9/1979 | Best | 178/22 |
| 4,193,131 | 3/1980 | Lennon et al. | 375/2 |

OTHER PUBLICATIONS

*Motorola M68⁰⁰ Microprocessor Application Manual,* 1975, Motorola, Inc. pp. 1–8.

Primary Examiner—Howard A. Birmiel
Attorney, Agent, or Firm—Michael M. Sakovich

[57] ABSTRACT

Apparatus for use in a secure data communication system includes a microcomputer that controls a cipher process by which sensitive data is encrypted before transmission. When activated, the apparatus accepts either cleartext or ciphertext and transforms the text to its opposite form according to an algorithm that is past dependent and which is also dependent on a pseudo random cipher key. Ciphertext may then be stored in an information retrieval system or transmitted to a destination terminal where the text is deciphered in real time by a corresponding second apparatus that stores the same key. In either case, security of transmitted and stored data is maintained since the sensitive data is in encrypted form. A set of logical instructions according to the algorithm is stored in a read only memory of the microcomputer which includes an EPROM unit having a data field of predetermined characters. The cipher process is initiated by a control character and starts with predetermined seeds that establish a first origin in the data field for each line of text to be encrypted. This origin is then translated to a second origin of the data field in response to four characters that are randomly generated by a counter. A variable sequence of iterative logical operations transforms cleartext to ciphertext and provides a key stream that is non-linear, random-like and which possesses an encryption period that is substantially longer than the period of any line so that the periodicity of the key stream is never indicated. The cipher keys for each line of text are temporarily stored in a read/write memory to permit editing operations and are erased at the onset of the next line.

30 Claims, 12 Drawing Figures

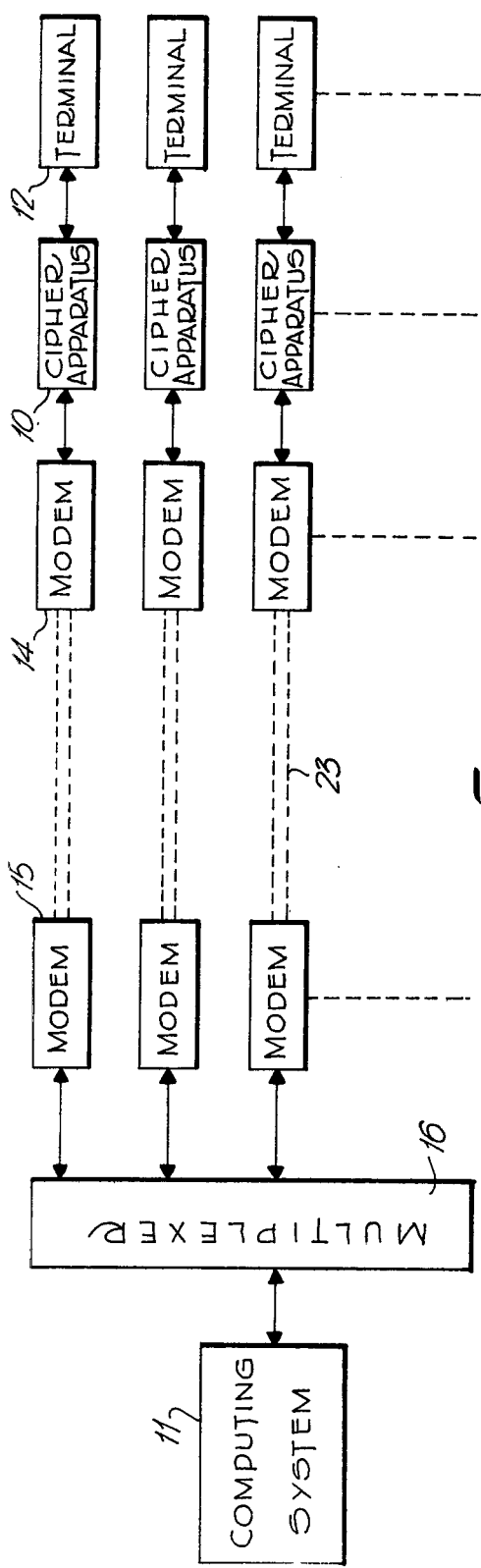
Fig-1-
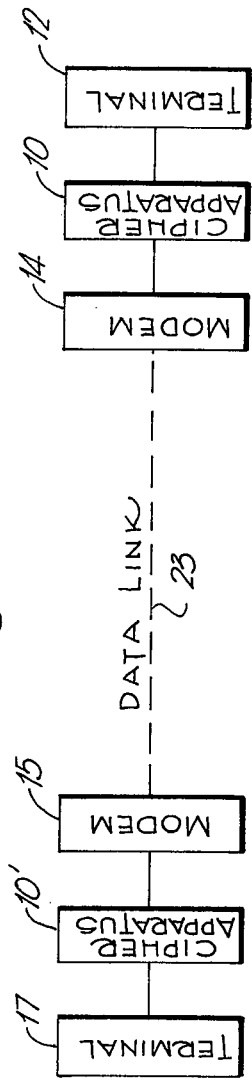
Fig-2-

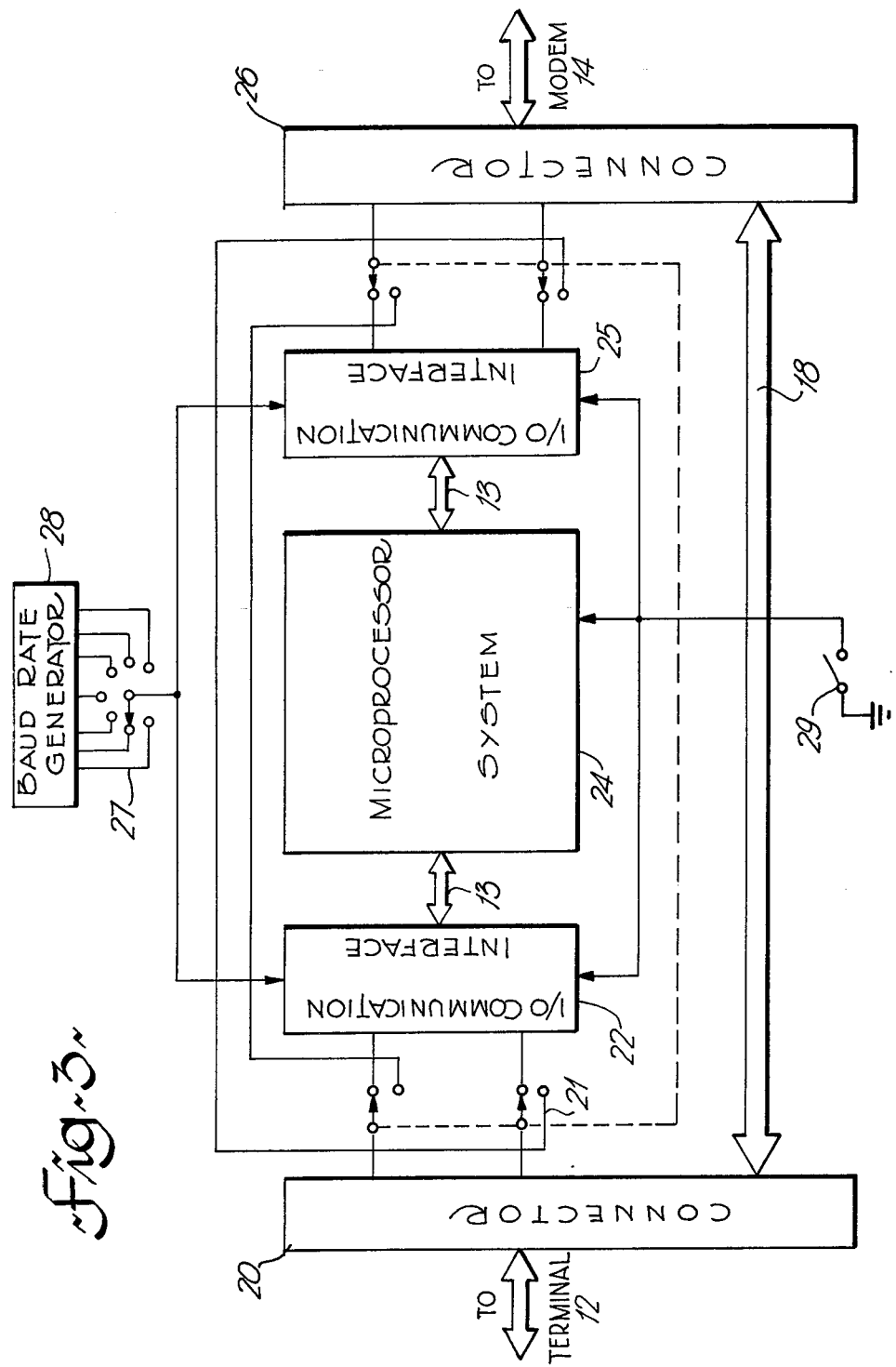

PAST DEPENDENT MICROCOMPUTER CIPHER APPARATUS

BACKGROUND OF THE INVENTION

The present invention relates to a cipher system and more particularly to a method and apparatus in such system in which digitally encoded data characters are selectively encrypted or deciphered in response to predetermined control characters and to a past dependent algorithm.

Information storage and retrieval systems utilizing centrally located computers with which communication may be established by practically any subscriber in a telephone system are highly vulnerable to unauthorized access. Information of a sensitive nature which is stored in computer memory banks is virtually open to snoopers who have access to the memory through data processing networks of the telephone system. Unauthorized access and reproduction of sensitive data is therefore easily achieved. Since the theft of information does not involve physical change in the original, an authorized user may be unaware initially of the theft which may only come to light after the confidentiality or value of the stolen information becomes known and adversely affects the rightful owner.

The increasing cost of postal services coupled with the uncertainty of mail delivery has established an environment for improved postal services, one form of which is "electronic mail". Established telephone systems will undoubtedly play a large part in such a system by permitting messages to be transmitted from a calling telephone subscriber station to a called station. The full benefits of such a system would probably necessitate apparatus for message conversion into digital data and high speed transmission to the receiver where corresponding apparatus would reconvert the message into cleartext form.

The advent of an electronic mail system would necessitate safeguards to prevent unauthorized acquisition of transmitted data. Cipher systems using known techniques are useful in safeguarding the data from electronic eavesdroppers.

Some digital cipher systems have been constructed with hard-wired or custom designed logic which results in apparatus that is expensive to acquire and which is inflexible in its use. The low cost of currently available microcomputer circuits now makes it feasible to economically implement digital cipher systems so as to overcome the disadvantages of the prior art. The use of software logic for instance has an immense advantage of flexibility by which future changes in the requirements of equipment can be readily incorporated through software rather than hardware changes.

SUMMARY OF THE INVENTION

The present invention overcomes substantially the problems associated with the prior art by providing that a communication line as well as the files of a computer system are secured by transmitting and storing data in ciphertext form.

Another provision of the invention is that only one cipher apparatus is needed for each communication link with a host computer in which data is stored.

A further provision of the invention is that no special computer ports are required which contrasts with known systems that require a special port equipped with an identical cipher apparatus.

The invention also provides error correction of the ciphertext and cleartext and a change from clear to cipher mode or vice versa can easily be accomplished within the same file of a computer and even on the same text line so that only sensitive portions of communicated text need be encrypted.

The invention still further provides almost complete assurance that the text has been received by the computer since the local copy is displayed at the terminal from text transmitted back from the computer.

Still another provision of the invention is automatic deciphering of the encrypted data when read at a terminal equipped with a similar cipher apparatus and possessing the same cipher key.

A still further provision of the invention is apparatus adapted for use in point to point data communication systems not containing a host computer.

A still further provision of the invention is a microcomputer to control the encryption/deciphering process and data communications.

The disadvantages of the prior art may be substantially overcome and the foregoing provisions of the invention achieved by recourse to the various aspects of the invention disclosed herein. One aspect of the invention relates to a past dependent method for selectively encrypting and deciphering digitally encoded data characters in a microcomputer having a read only memory for storing data words and operational instructions, a read/write memory for storing data, a microprocessor adapted to process data characters input thereto in an orderly and logical manner responsive to retrieved instructions, and bus means communicating the microprocessor with its memories, an input port and an output port. The method comprises the steps of:

(a) retrieving the contents of a key register in the read/write memory and performing a first logical operation with a cipher key thereof on a first data character input at the input port to transform the character into one of, a corresponding encoded encrypted and deciphered character at the output port; and (b) performing a variable sequence of iterative logical operations on the cipher key to generate a new key for transforming a succeeding encoded data character input at the input port, the number of iterative steps being determined by the position of the data character with respect to one of, a predetermined previously input control character and a previous physical or logical data character line end.

Another aspect of the present invention relates to microcomputer apparatus for selectively encrypting and deciphering digitally encoded data characters in a past dependent method, including a read only memory for storing data words and operational instructions, a read/write memory for storing data, a microprocessor adapted to process data characters input thereto in an orderly and logical manner, and bus means communicating the microprocessor with its memories, an input port and an output port. The apparatus comprises:

(a) means for retrieving the contents of a key register in the read/write memory and performing a first logical operation with a cipher key thereof on a first data character input at the input port to transform the character into one of, corresponding encoded enciphered and deciphered character at the output port; and (b) means for performing a variable sequence of iterative logical operations on the cipher key to generate a new key for transforming a succeeding encoded data character input at the input port, the number of iterative steps being determined by the position of the data character with respect to one of, a predetermined previously input control character and a previous physical or logical data character line end.

DESCRIPTION OF THE DRAWINGS

The invention will now be more particularly described with reference to embodiments thereof shown, by way of example, in the accompanying drawings wherein:

FIG. 1 is a block diagram of a storage-retrieval system that includes the present invention;

FIG. 2 is a block diagram of a point to point system that includes the present invention;

FIG. 3 is a block diagram of cipher apparatus shown in FIGS. 1 and 2;

DESCRIPTION OF THE ILLUSTRATED EMBODIMENTS

Figure 4:
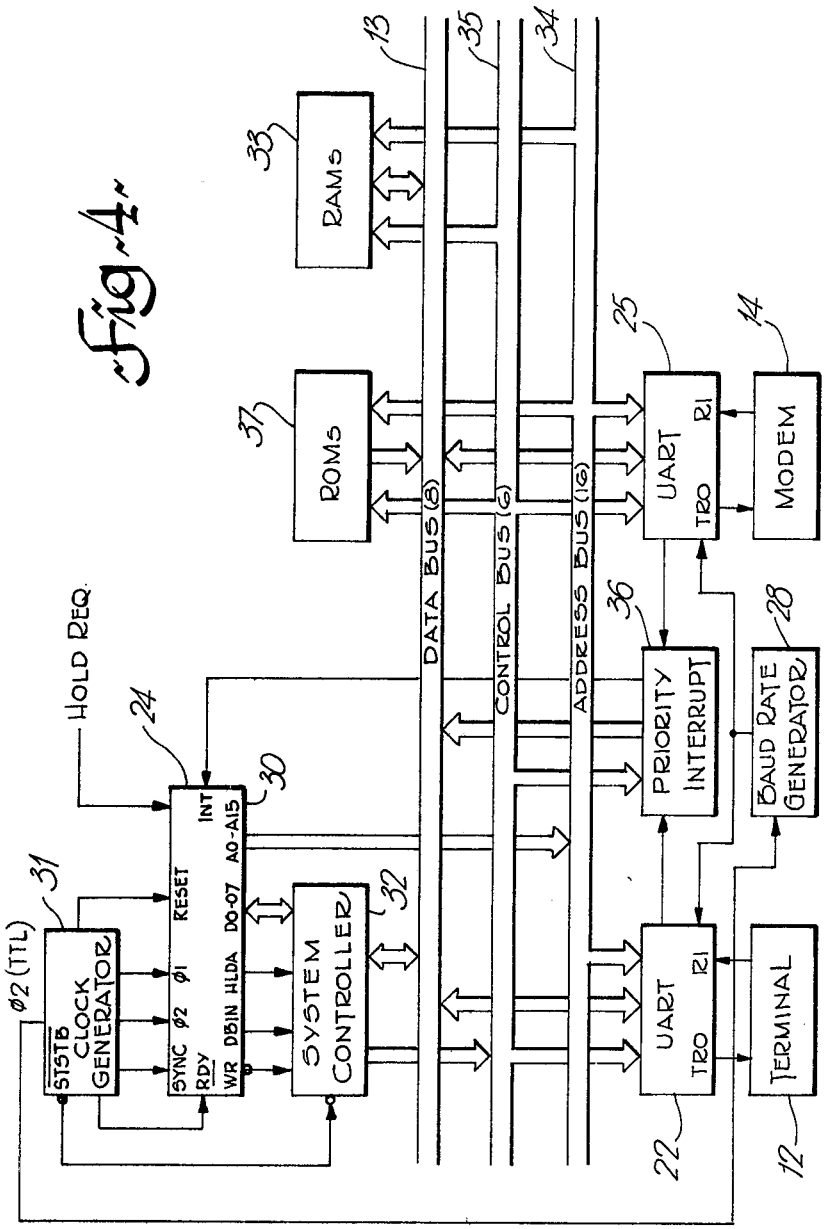
FIG. 4 is a more detailed block diagram of part of the apparatus illustrated in FIG. 3.

In the following discussion of the foregoing figures, it will be understood that the term encrypt and the various forms thereof have the same meanings as the term encipher and its corresponding derivatives.

Referring now to the drawings, FIG. 1 is a system for storage and retrieval of data and is configured to operate with the present invention. An embodiment of the invention, herein to be described, is shown as a cipher apparatus 10 which has been primarily developed for a "mailbox" environment where encrypted messages are stored within a computer system 11 and carry header information giving the identification of a proposed recipient. The recipient can obtain the message in cleartext only if a terminal 12 that is used to communicate with a system 11 is equipped with an identical apparatus 10.

Each terminal 12 communicates with the system 11 by way of a bidirectional data link 23 that is connected serially with the apparatus 10, a modem 14 located at the terminal end of the data link, a modem 15 located at the system 11 end of the data link and a multiplexer 16 which communicates directly with the computing system 11. The system herein to be described was tested with an IBM 370 computer which comprised the system 11. It will be understood, however, that the invention is not restricted to the IBM computer and may be used with other similar computers provided that the protocol thereof is compatible with the requirements of the apparatus 10. It will be further understood that the apparatus 10 is sufficiently flexible in its design that it can be easily adapted to other computer systems and file types by merely reprogramming a microprocessor of the apparatus 10.

Another system in which the apparatus 10 has application is shown in FIG. 2 and is illustrated in block diagram form as a point to point system. A basic similarity with the system of FIG. 1 is apparent. The principal difference resides in the replacement of the computing system 11 with apparatus duplicating that used at the originating terminal 12 end shown on the right-hand side. Thus, data input at the terminal 12 is processed by the apparatus 10 and is transmitted from the modem 14 over the data link 23 to the modem 15 at the receive end. Data output from the modem 15 is then processed by a duplicate cipher apparatus 10' from which it is coupled to a receive terminal 17. Unlike the system of FIG. 1, the recipient in the system of FIG. 2 will automatically obtain an encrypted message in cleartext form since the apparatus 10' is identical to the apparatus 10 and is adapted to operate in this manner.

In each system, the apparatus 10 is interposed between a terminal and its associated modem. When activated, the apparatus 10 will accept cleartext input and transform it to ciphertext according to a predetermined algorithm hereinafter described in greater detail. In FIG. 1 the ciphertext will be transmitted by the modem 14 and stored within the system 11 to which an output of the modem 15 is applied. Conversely, when the apparatus 10 is activated by data output from the system 11, the apparatus 10 will decipher the ciphertext input and produce cleartext output to the terminal 12. As mentioned in connection with FIG. 2, the apparatus 10 will operate to decipher any ciphertext when it is received over the data link 23 from the apparatus 10'.

When the apparatus 10 is connected to a terminal and "private" communication is required, predetermined procedures must be followed in order to activate a cipher routine of the aforementioned algorithm. Once logged onto the computing system of FIG. 1, and placed in an input mode, a message can then be input. In order to activate the cipher routine it is necessary to precede a private portion of a message with a left-hand delimiter character (<). The ocurrence of this character will automatically enable the apparatus 10 to produce corresponding ciphertext. A private portion of the message is closed, or the apparatus 10 is returned to a cleartext mode, by the use of a right-hand delimiter character (>). The apparatus 10 will therefore encrypt any text occurring after a left-hand delimiter character (<) is received and will continue to do so until a right-hand delimiter character (>) is received. Since the apparatus 10 is adapted to restore ciphertext to cleartext under these circumstances, ciphertext reflected or transmitted back from the system 11 will be reproduced at the terminal 12 in cleartext form. Similarly, having regard to FIG. 2, the message copy produced at the terminal 12 will also be in cleartext form if the message transmitted from the terminal 17 is in ciphertext form. Thus, the message copy produced at the terminal 12 will be in cleartext form if the message originates at either a transmission terminal or the system 11.

If the message originates at the terminal 12 of FIG. 1 and the system is in a cipher mode, the message will be encrypted and sent to the system 11 where it will be stored on file and concurrently reflected back to produce a local copy. The apparatus 10 will therefore decipher the reflected message to produce a cleartext copy of the message that was transmitted in ciphertext form. Hence, no local copy is taken before transmission of data. In either system of FIGS. 1 and 2 the cipher routine is activated upon reception of a left-hand delimiter and a received message will appear in cleartext form. As a result, the data link 23, as well as the files of the computing system 11 are secure since sensitive data are always transmitted and stored in ciphertext form.

A more detailed block diagram of the apparatus 10 is shown in FIG. 3. Beginning with the terminal 12 it will be observed that the output therefrom is communicated through a connector 20 and by a bypass switch 21 to an I/O communication interface device shown as a universal asynchronous receiver transmitter (UART) 22. It will be understood that data input to the UART 22 occurs in serial form and that the output therefrom is in parallel form and is applied to a bidirectional 8-bit data bus 13 of a microprocessor system 24.

The bus 13 communicates the output of the system 24 to another I/O communication interface device which is shown as a UART 25. The UART 25 converts its 8-bit parallel input to a serial output that is coupled through the switch 21 to an output connector 26 and therefrom to the modem 14. An appropriate baud rate for the UARTs 22 and 25 is selected by a selection switch 27 that is connected to a plurality of outputs of a baud rate generator 28.

Referring again to the switch 21, it will be seen that the system 24 may be bypassed if cleartext only is to be transmitted from the terminal 12 to the modem 14 or if a ciphertext printout of a received transmission is required. Should it be required to see the encoded form of the text as it is stored within the system 11, the apparatus 10 must be bypassed with the switch 21 in the bypass position. Note that when the switch 21 is in the bypass position the connector 20 is connected directly with the connector 26. When power is first applied, a reset switch 29 is actuated to initialize the system 24.

A bus 18 is shown which directly interconnects the connectors 20 and 26 to provide a plurality of individual paths between the terminal 12 and the modem 14. These paths are those not affecting the operation of the apparatus and are detailed in FIGS. 7 and 8.

Special editing and control characters that are used with the apparatus are listed as follows:

| CHARACTERS | DESCRIPTION |
|---|---|
| < | Left-Hand Delimiter |
| > | Right-Hand Delimiter |
| @ | Logical Character Delete |
| # | Logical Line End |
| [ | Logical Line Delete |
| " | Logical Escape |

When data is input from a terminal 12 to a computing system 11, mistakes will be encountered from time to time. For this reason, some editing functions have been made available to permit corrections. In the event that a minor error has been made, the logical character symbol (@) allows deleting one or more of the previous characters entered. The symbol (@) deletes one data character per (@) entered up to the beginning of the line or the next <, >, # whichever comes first. This feature and others will be seen in the examples that follow.

EXAMPLE 1

| <ABC@ | RESULTS IN | <AB |
| <ABC@@ | | <A |
| <AB#C@@D | | AB |
| | | D |
| <AB<C@@D | | <AB<D |
| <AB>C@@D | | <AB>D |
| <A | | <A |
| B@@ | | |
| <A | | <A |
| BC[<D@@ | | < |
| <A | | <A |
| BC[@<E | | BC<E |

The logical line end symbol (#) allows keying in more than one line of data without recourse to the carriage return or line feed functions.

EXAMPLE 2

| AB#CD#E#FG | RESULTS IN | AB |
| | | CD |
| | | E |
| | | FG |

The logical line delete symbol ([) (or ¢ for some terminals) deletes the entire previous physical line, or the last logical line back to (and including) the previous logical line end (#). It can be used to delete a line containing many errors. If a # signal immediately precedes the [ sign, only the # sign is deleted. If the physical line previous to the [ symbol contains a <, > or # the delimiter has to be reentered.

EXAMPLE 3

| <ABC[<DEF> | RESULTS IN | <DEF> |
| <ABC#DEF[<GHI> | | <ABC<GHI> |
| <A#B#C#[[[[<DIF> | | <DIF> |
| ABC[DEF | | DEF |

The logical escape symbol (") does not function in the encryption mode as an editing character. Instead, the symbol (") causes the computer of the system 11 to consider the next character entered to be a data character, even if it is normally one of the logical line editing symbols (@, [, " or #). The characteristics of the sybmol (") may be seen in the following example.

EXAMPLE 4

| <AB"C | RESULTS IN | <AB"C |
| ABC"[D | | ABC[D |
| ""ABC"" | | "ABC" |

A typical example of cleartext and its corresponding ciphertext is shown in Example 5.

EXAMPLE 5

<
| NAME | POSITION | DEPT. | SALARY |
|---|---|---|---|
| D. Smith | Manager | 26 | $18,500 |
| J. JONES | Engineer | 26/2 | $12,500 |
| H. Braun | Janitor | 17/2 | $12,500 |

>
<s
XRKTY1+1?NTUBBYMCE9418; FMDJ—)02(=BDA)SD

-continued

| < NAME | POSITION | DEPT. | SALARY |
|---|---|---|---|

```
g39 -,6;.99592$'- =456(4$4$:/ 3@7.
XX*Ggt)c? KyRPHIS)9'517 /& ), 96 ;:+7
GAl ; 98.+631( 9778:7-30:+&47?,+?0.13*5
QO,Wm'ue7TMJROUM:='.:"-70-14('
*):
FG(B)91?76-0+52'1(8) 0-94-51:-7=:+--6);.
gh7/ufx;HuvhbRH&?41==+:=5+),6)1/
'*-:493+/-7-;-+669/5)$18 3,39((+',(&
>
```

The algorithm of the present invention, herein later described, generates non-printing characters so that the total number of characters in a line of ciphertext may not be the same as that in the cleartext format. This characteristic of the algorithm is quite apparent in Example 5 wherein each even numbered line of cleartext is identical as to form and length. Conversely, reference to the ciphertext portion of Example 5 shows no duplication in either form or length. The transformation of cleartext to ciphertext is dependent on the previous text that has been input so that two identical words, given the non-printing characters, are never encrypted in the same manner. In order to more completely randomize the cipher algorithm as later described, the apparatus 10 automatically generates four random characters when it switches into the encryption mode. This helps prevent potential code breaking by the method of inserting a known message and comparing same with its ciphertext version.

It will be understood that each line of ciphertext automatically initiates a new cipher key stream. As a result, noise immunity of the system is improved since if a data transmission error occurs within a line of text only the remainder of that line will not be correctly deciphered. The editing features of the system also provide a particular advantage in file management in that a file may be conveniently entered at any line which is facilitated by each new key stream. By keeping the key stream period much greater than the maximum number of characters appearing in one line (80 characters in the apparatus 10) the periodicity of any key stream is never indicated as is apparent in Example 5.

Another feature of the apparatus 10 provides that confidential ciphertext data can be further encrypted within a multi-user file so that only predetermined individuals can have access to such data. An example of this feature is shown in Example 6 wherein the ciphertext form of salary data is encrypted and is therefore available only to authorized recipients.

EXAMPLE 6

| NAME | POSITION | DEPT. | SALARY |
|---|---|---|---|
| D. Smith | Manager | 26 | <$18,500> |
| J. Jones | Engineer | 26/2 | <$12.500> |
| H. Braun | Janitor | 17/2 | <$12.500> |
| D. Smith | Manager | 26 | <179/..> |
| J. Jones | Engineer | 26/2 | <co;&=.'> |
| H. Braun | Janitor | 17/2 | <(-=*> |

Turning now to FIG. 4 there will be seen a detailed functional block diagram of the microprocessor system 24. The system 24 is shown to comprise a microprocessor 30 together with a clock generator 31 and a system controller 32. Data originating at the terminal 12 is input to the UART 22 by way of its serial input and output therefrom to the data bus 13. It will be noted that the output from the UART 22 is bidirectional and is shown in this manner to indicate that the UART 22 is adapted to also receive input data from the bus 13 for output at its serial output to the terminal 12. Note also that data on the bus 13 may flow in a bidirectional manner to the controller 32 and to read/write memories shown as random access memories (RAM) 33.

An output from the modem 14 is coupled to the UART 25 by way of a similar serial input and the output from the UART 25 is similarly coupled to the bus 13. Other busses communicating with both UARTs comprise a 16-bit address bus 34 and a 6-bit control bus 35. An interrupt output from each UART is coupled to a priority interrupt circuit 36 having one output coupled to an interrupt terminal 38 of the microprocessor 30.

The baud rate generator 28 is shown with its output coupled to both UARTs. The clock input of the baud rate generator 28 is shown originating from the clock generator 31.

The system 24 may also be referred to as a microcomputer since it comprises the microprocessor 30 together with its clock generator 31 and controller 32, the RAM memories 33 and read only memories which are shown as programmable read only memories (PROM) 37. Both memories 33 and 37 are shown coupled to each of the busses 13, 34 and 35 and communicate thereby with the microprocessor 30 and its controller 32.

Two basic levels of cipher keys are provided by and are stored in the apparatus 10. An electrically reprogrammable PROM 37 stores a random 2048 bit pattern and is used as a cipher key on a 'corporate' level. Each apparatus pair 10 and 10' within a system as in FIG. 2 would therefore carry the same random pattern of bits and could readily communicate in the encryption format. For the user who requires a higher level of security above the corporate level within the same system, it is possible to program an individual key into an apparatus 10. The operator merely presses an ENTER KEY pushbutton at a keyboard (not shown) of the terminal 12 and proceeds to type characters from the keyboard until an ENTER KEY indicator (not shown) of the apparatus 10 extinguishes. The number of characters required is fifteen and all further characters are ignored. The characters input can be alphabetical or numerical in any combination and are used to transpose the 2048 bit pattern in the PROM 37 into a new and individual pattern in the RAM 33. Most users would, however, probably employ an easily remembered phrase or number combination for developing individual cipher keys. The apparatus 10 is retired from the key entry mode by again depressing the ENTER KEY pushbutton. By this method a requirement for a large family of individual keys may be obtained and easy changing of keys is readily implemented. Return to the corporate key from the the individual key is accomplished by operating the reset switch 29.

Figure 5:
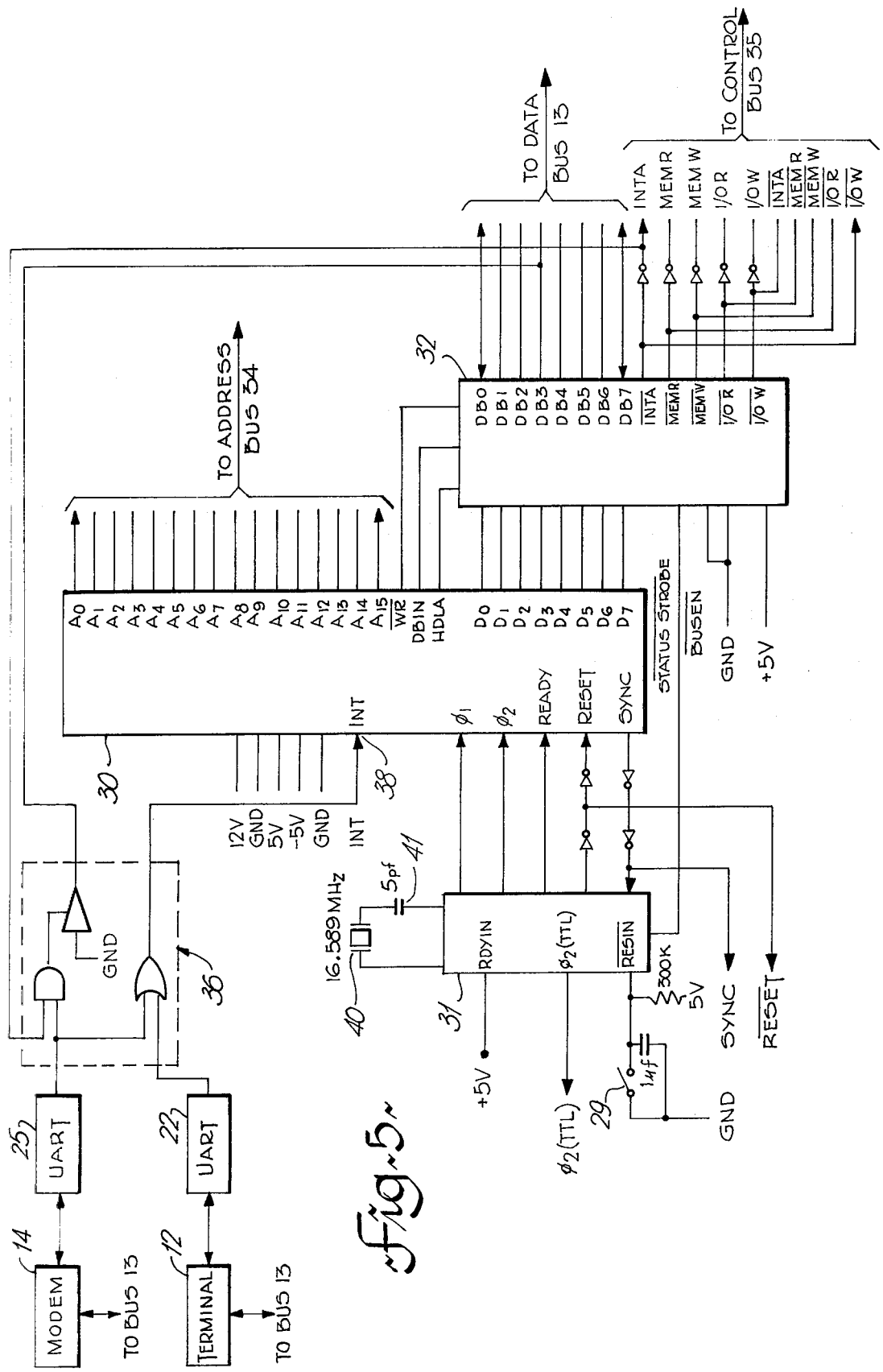
FIG. 5 is a block diagram showing in greater detail a clock generator, microprocessor and system controller of FIG. 4.

Referring next to FIG. 5 it will be understood that the microprocessor 30 is an Intel microprocessor type 8080 which controls the functions of other components in the apparatus 10 by fetching instructions and data words from the RAM 33 and PROM 37, decoding the binary contents of such instructions and data words followed by sequential execution thereof. A 16-bit address bus input having terminals $A_0$–$A_{15}$ connects the microprocessor 30 to the bus 34. In this regard, the microprocessor 30 includes internal registers, an arithmetic/- logic unit (ALU) and control circuitry which are not separately shown since the Intel product line is well documented and it will be understood that the control and operation of the microprocessor is well known to those skilled in the art. For completeness of this description, however, the microprocessor 30 is illustrated in FIG. 5 in block diagram form showing the various pin numbers thereof and their connections to other components, operating potentials, data and control signals.

The microprocessor 30 requires timing signals which are provided by the clock generator 31 shown in FIG. 5. It comprises an Intel type 8224 clock generator and driver and the frequency of the generator 31 is under control of a crystal 40 and a serially connected trimming capacitor 41. Two clock outputs $\phi_1$ and $\phi_2$ from the generator 31 are connected to the microprocessor 30 in order to comply with the known timing requirements thereof.

The frequency of the generator 31 has been derived as follows:

(a) $9600 \times 16 = 153,600$ Hz, the frequency needed by the UARTs 22 and 25 for 9600 baud which is the highest baud rate to be used with the apparatus 10;

(b) $153,600 \times 12 = 1,843,200$ Hz, the frequency used for the microprocessor 30 and which is an integer multiple of 153,600; and (c) $1,843,200 \times 9 = 16,588,800$ Hz, the frequency required to drive the generator 31 to produce 1,843,200 Hz for the microprocessor 30.

Other inputs to the generator 31 and outputs taken therefrom may be seen in FIG. 5. For example, the $\phi_2$ (TTL) output that controls the generator 28 is shown. A $\overline{\text{RESIN}}$ input to the generator 31 comprises an active low switch closing which includes the reset switch 29. Operating the switch activates the generator 31 to produce a reset high level that is applied to the reset input of the microprocessor 30.

The controller 32 is shown in FIG. 5 and is an Intel System Controller and Bus Driver type 8228. As with the microprocessor 30 and the generator 31, the controller 32 is similarly well known in the art so that a detailed description of its function is not required. However, its interconnection to the other components of the apparatus 10 is indicated in FIG. 5 in order to provide a more complete disclosure. The various functions of the controller 32 include generating all necessary control signals which are required to interface the microprocessor 30 with the RAM and PROM memories as well as with the bus 13. Additionally, the controller 32 functions as a bidirectional data bus buffer and driver. Furthermore, a control bus output of the controller 32 is coupled to the bus 35 to control the operation of the various components of the apparatus 10 together with the UARTs 22 and 25 and the priority interrupt 36. As a result, the apparatus 10 functions in a logical and uniform manner.

The interrupt terminal 38 input of FIG. 5 functions to provide servicing of the UARTs 22 and 25 which comprise the data input/output ports of the apparatus 10. A signal from each UART is accepted at the terminal 38 and interrupts the microprocessor 30. Identification of the interrupting UART (22 or 25) is made by the microprocessor 30 going through a service routine and identifying the interrupting device by the data dumped onto the bus 13.

It will be noted at this point that each of the UARTs 22 and 25 may at times operate to either receive or transmit data depending on the mode of the apparatus 10. For example, in an encryption mode, the UART 22 receives input data from the terminal 12 which is dumped onto the data bus 13 and is then processed by the apparatus 10. The processed data is then output to the same bus and is coupled to the input registers of the UART 25 from which it is output to the modem 14. Conversely, having regard to FIGS. 1 and 4 of the drawings, when data is output from the system 11 either as a reflected output, or as an output taken from a stored file, such data is received by the input registers of the UART 25 from the modem 14. The output of the UART 25 is then dumped onto the data bus 13 where the data is processed by the apparatus 10. The processed data is then coupled to the input registers of the UART 22 and output therefrom to the terminal 12.

Figure 6:
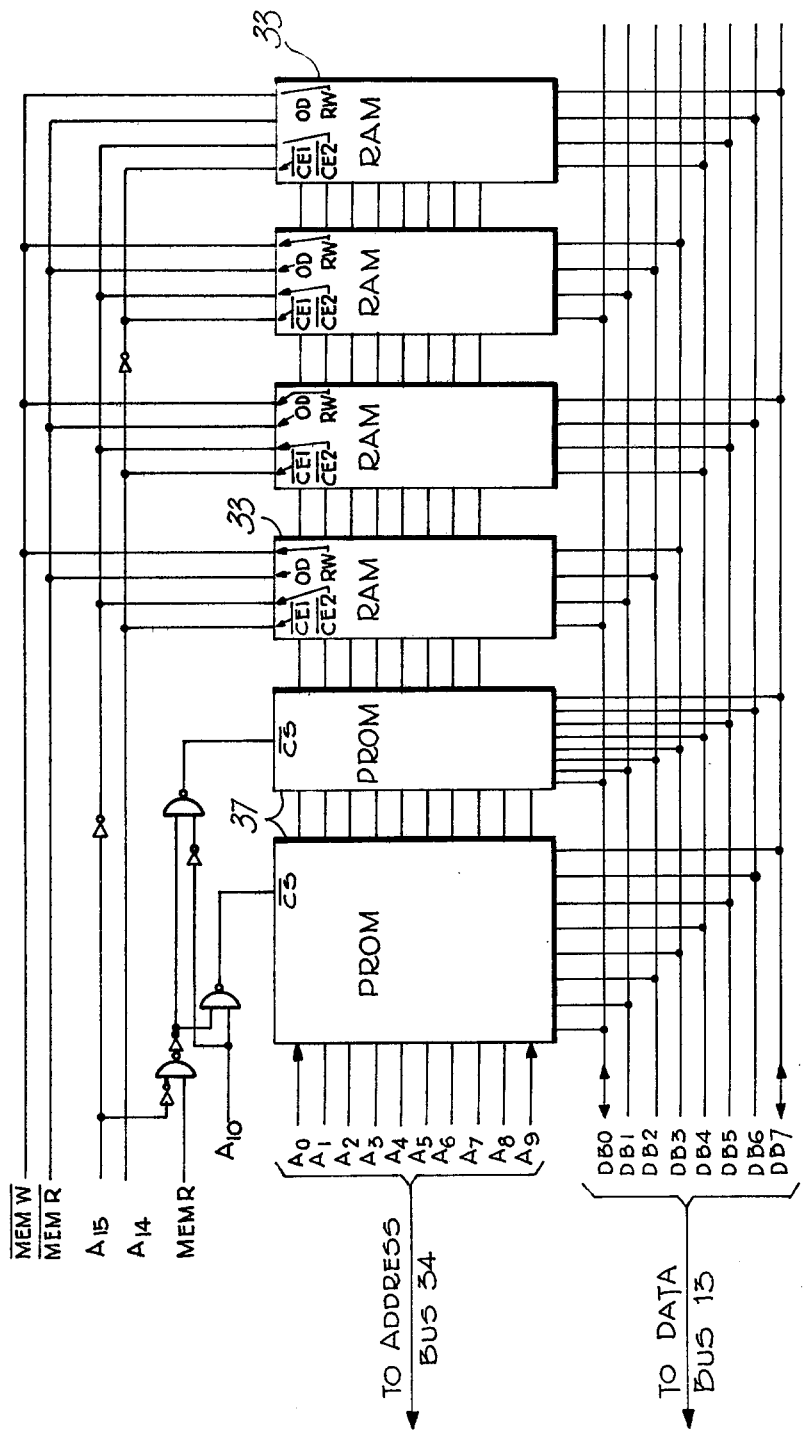
FIG. 6 is a block diagram showing in greater detail a memory configuration indicated in FIG. 4.

Reference to FIG. 6 shows the PROM 37 which comprises two Intel type 8708 Erasable and Electrically Reprogrammable Read Only Memory chips with each chip providing 1024 bytes of PROM memory. As regards the RAM 33, at least four Intel type 8111 Static MOS RAM memories are used, with each RAM providing a storage capacity of 256 bytes. For use of the individual cipher key option of the RAM capacity must be increased to 8 RAM memories. It will be noted that address inputs $A_0$–$A_9$ are for the PROMs 37 whereas the RAMs 33 employ $A_0$–$A_4$ as row select inputs and $A_5$–$A_7$ as column select inputs from the bus 34. The remaining outputs of the bus 34 are shown as RAM chip enable inputs $A_{14}$ and $A_{15}$ and a PROM chip select $A_{10}$. Read and write control inputs to both PROMs and RAMs are taken from the controller 32 via the bus 35 as indicated in FIGS. 4 and 5.

Figure 7:
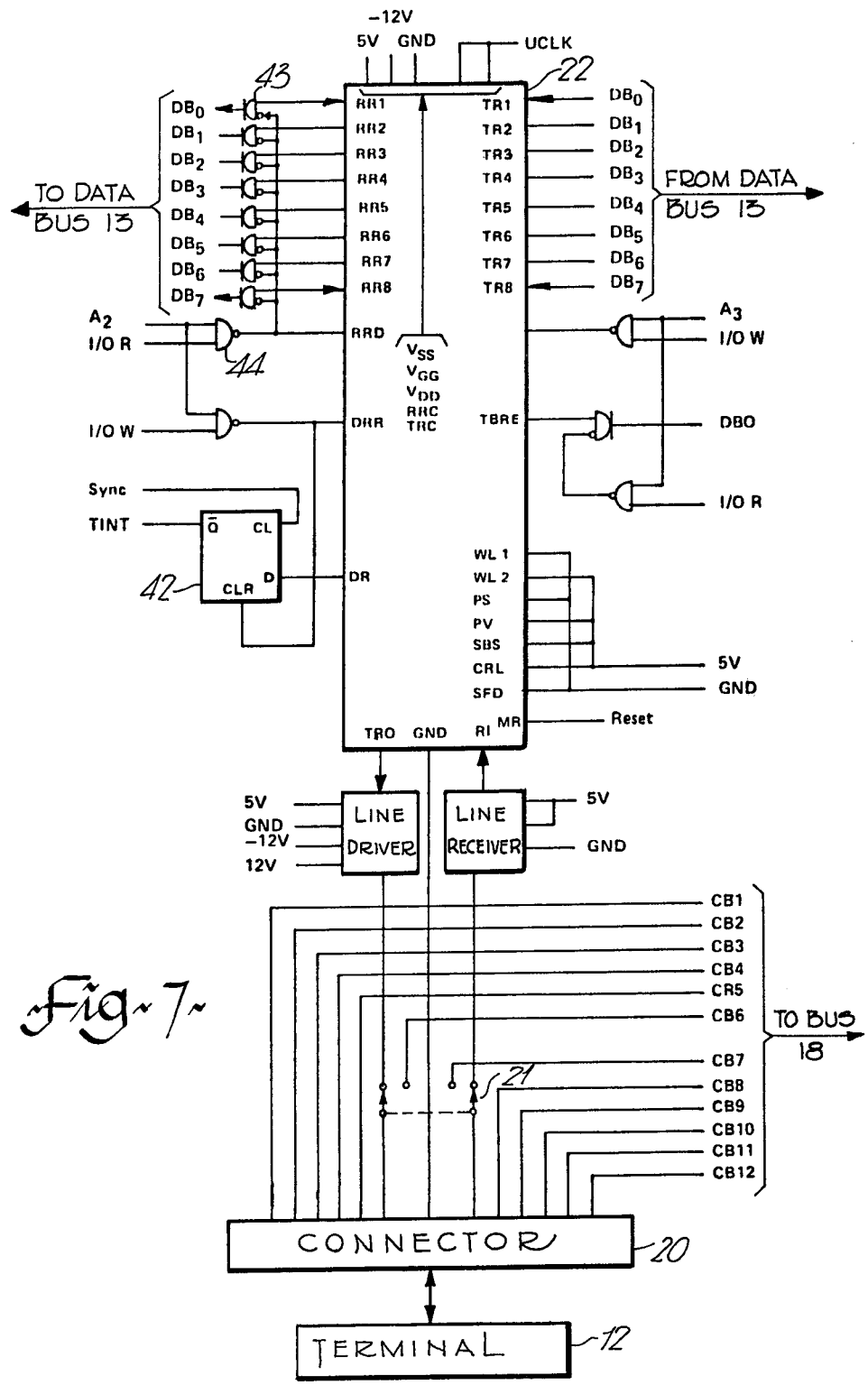
FIG. 7 is a block diagram of a terminal interface used with the present invention.
Figure 8:
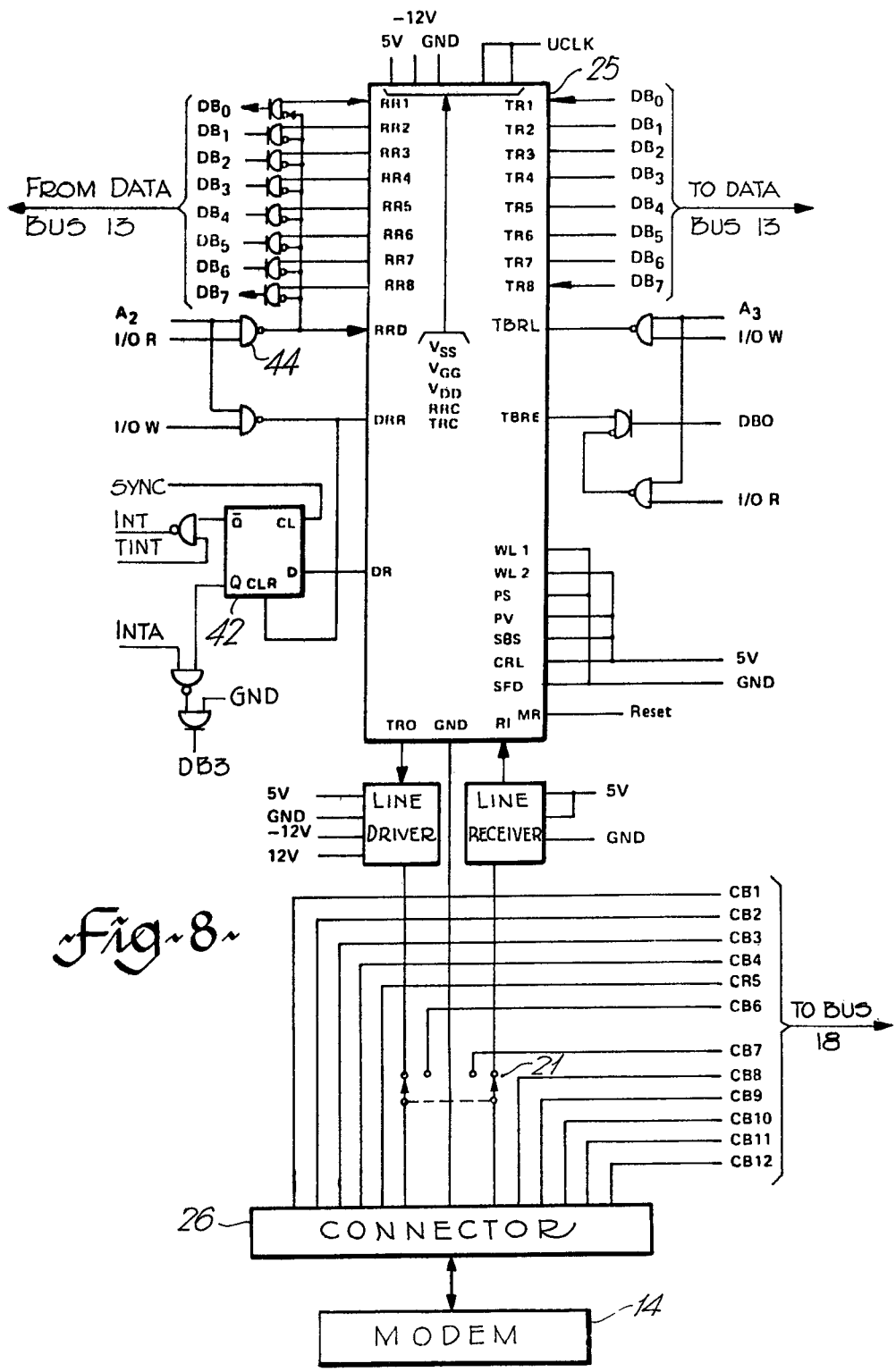
FIG. 8 is a block diagram of a modem interface used with the present invention.

FIGS. 7 and 8 show, respectively, the terminal 12 and modem 14 interfaces with the microprocessor 30. As indicated in the other figures, an interface occurs via either the UART 22 or 25, each of which are programmed for 7 data bits, 2 stop bits and zero parity bits as required for the system 11 of FIG. 1. Each UART comprises a TMS 6011 UART which is known in the art. A detailed description of the structure and operation of each UART is therefore not required although a functional description is presented herein below to sufficiently describe the operation thereof in connection with the apparatus 10 to provide a complete and full understanding to one skilled in the art of digital microcomputers.

For the terminal interface of FIG. 7, the following instructions are stored in the PROMs 37:

(a) an instruction "IN 004" ($A_2$) transfers the contents of a receiver buffer register of the UART 22 to an accumulator register of the microprocessor 30. It will be noted that the aforementioned UART register has outputs labelled RR1-RR8.

(b) an instruction "OUT 008" ($A_3$) transfers the contents of the accumulator register of the microprocessor 30 to a transmitter buffer register of the UART 22. In this instance, it will be observed that the UART register has inputs labelled TR1-TR8.

(c) the instruction "OUT 004" ($A_2$) resets a "Data Ready" flip-flop within the UART 22 by way of an input terminal DRR. An interrupt flip-flop 42 is likewise reset.

(d) the instruction "IN 008" ($A_3$) tests the state (Empty or Loaded) of the transmitter buffer register of the UART 22.

Similar instructions, with appropriate addresses apply for the UART 25 of FIG. 8.

It will be observed in both FIGS. 7 and 8 that the outputs RR1-RR8 connect to tristate gates 43 which output to the data bus 13. The interrupt 36 of the apparatus 10 makes use of the fact that if all the gates 43 are in the high impedance state, the bus 13 will be at a logical '1' level. Hence, if an interrupt occurs at a time when INTA='1' and nothing is read on the bus 13, a 377 (octal notation) will be decoded at the instruction decoder of the microprocessor 30 which is a restart instruction RST 070. Since a restart instruction RST 060 is produced by reading a '1' on the data line DB$_3$ during an interrupt acknowledge, INTA='1', it is apparent that RST 060 has priority over RST 070. In this way, interrupt priority is given to the UART 25 to avoid the possibility of data loss when it is reflected or transmitted to the terminal 12 from the computer of the system 11. This priority arrangement has been derived on the basis that an operator at the terminal 12, being the slowest element of the overall system, can reasonably wait a short interval whereas the computer of the system 11 in its multiplexing arrangement must transmit data when commanded. A more complete appreciation of this aspect of the apparatus 10 will be obtained in the description to follow concerning the software for the microcomputer.

The various method steps followed when the UART 22 accepts a character from the terminal 12 and passes this character on to the microprocessor 30 will next be considered. The character arriving from the terminal 12 is firstly shifted into the receiver buffer register of the UART. This places the data ready flip-flop (not shown) of the UART 22 in the logical '1' state. At the next transition from logical '0' to logical '1' of the sync signal from the microprocessor 30, the interrupt flip-flop 42 is set to the logical '1' level. The interrupt request will now be accepted by the microprocessor and the instruction "IN 004" follows. This causes the terminal RRD to go to a logical '0' at time I/O R='1' since the instruction and the logical '0' both appear as inputs of a NAND gate 44. It will be observed that the output of the gate 44 is connected directly to the terminal RRD. RRD='0' will therefore pass on the contents of the receiver buffer register to the bus 13 and write it into the accumulator of the microprocessor 30. Now the UART 22 has to be reset to be ready to accept the next character. The instruction "OUT 004" will bring DRR to a logical '0' which will reset the Data Ready flip-flop of the UART 22 and the flip-flop 42.

Next, the various steps required for the transition of a character from the accumulator of the microprocessor 30 to the terminal 12 will be considered. In this instance, the instruction "IN 008" will test the condition of the transmitter buffer register. If the register is still loaded with the previous character, the microprocessor 30 keeps on generating the instruction "IN 008" until it finds the transmitter buffer register empty. Then the instruction "OUT 008" will follow. The contents of the accumulator are now transferred to the transmitter buffer register of the UART 22. As soon as the transmitter register is empty because the previous character has been shifted out to the terminal 12, the character within the transmitter buffer register will be transferred to the transmitter register. Now the UART 22 is ready for the next character which can again be tested with the instruction "IN 008".

The process steps for the UART 22 apply in a similar manner for the UART 25 of FIG. 8 interfacing with the modem 14 where like numbers are used to identify corresponding components.

Figure 9:
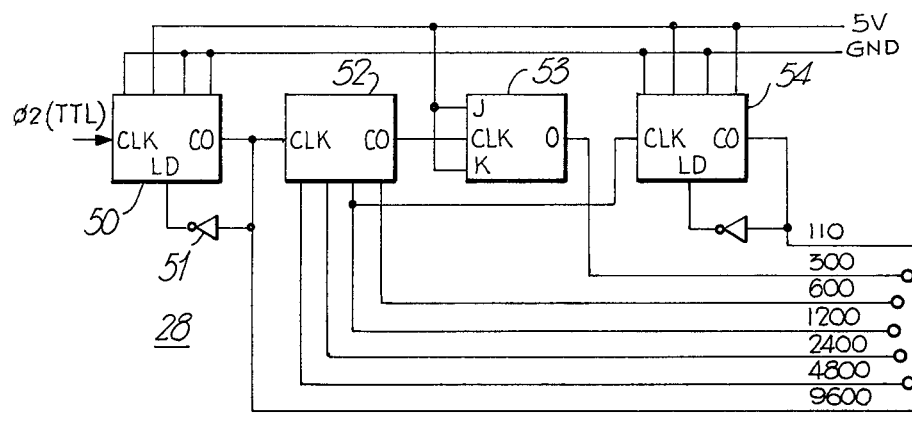
FIG. 9 is a circuit diagram of a baud rate generator used with the present invention.

FIG. 9 is a detailed block diagram of the band rate generator 28. The signal $\phi_2$ (TTL) obtained from the clock generator 31 drives the CLK input of a synchronous 4-bit counter 50. A "carry output" therefrom loads a 0100 back in the counter via an inverter 51. The counter 50 counts up and at the next carry loads another 011 as in the first instance. Hence, $\phi_2$ (TTL) is divided by twelve which produces the frequency 9600×16 Hz that is needed to drive the UART at a rate of 9600 baud. Similarly, the foregoing frequency is counted down to produce baud rates of 4800, 2400, 1200 and 600 by a second synchronous 4-bit counter 52. The output of the counter 52 provides a CLK input for a J-K flip-flop 53 to further count down the frequency to produce a baud rate of 300. Finally, the frequency that is used to produce the baud rate of 1200 drives the CLK input of a third synchronous 4-bit counter 54 which divides by twelve and counts down the frequency to produce a nominal baud rate of 110. Various outputs of the generator 28 appear at the switch 27 and may be selected thereby as required.

Figure 10:
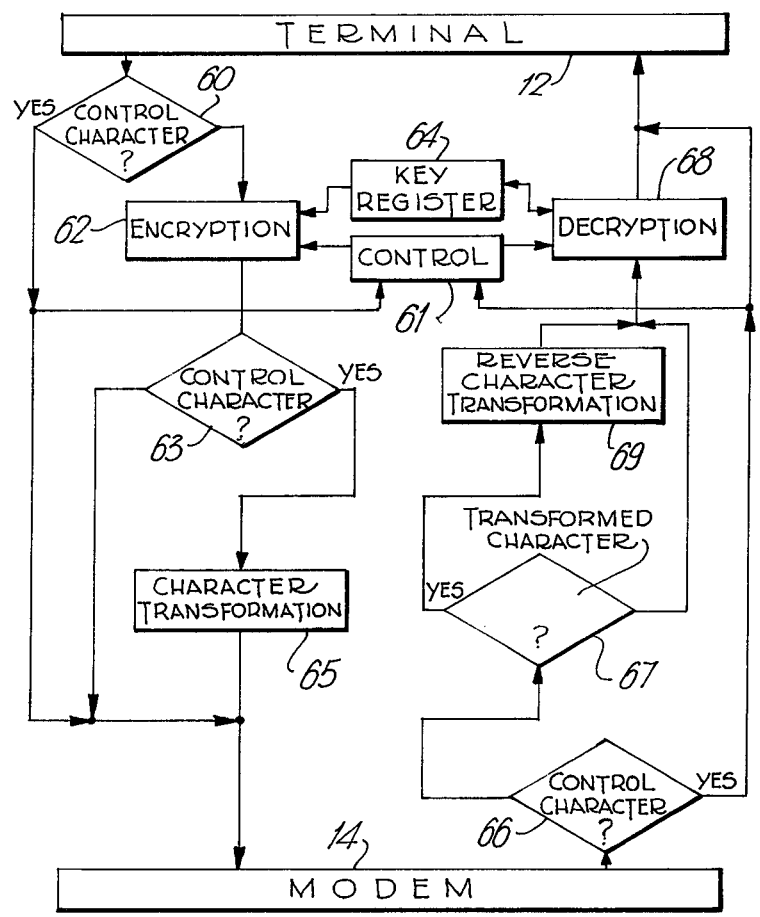
FIG. 10 is a simplified flow chart of software used in the present invention.
Figure 11:
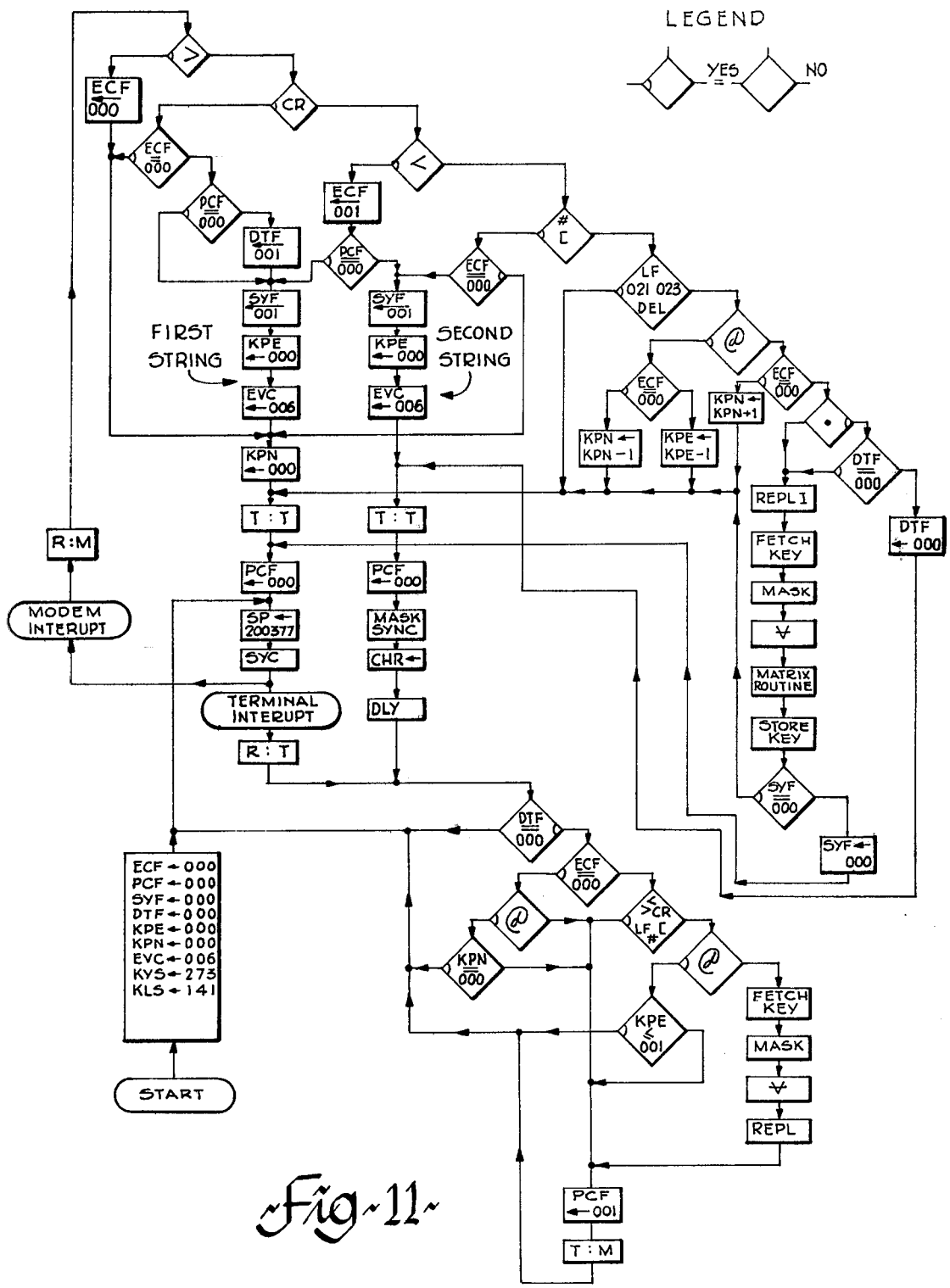
FIG. 11 is a more detailed flow chart of the software shown in FIG. 10.
Figure 12:
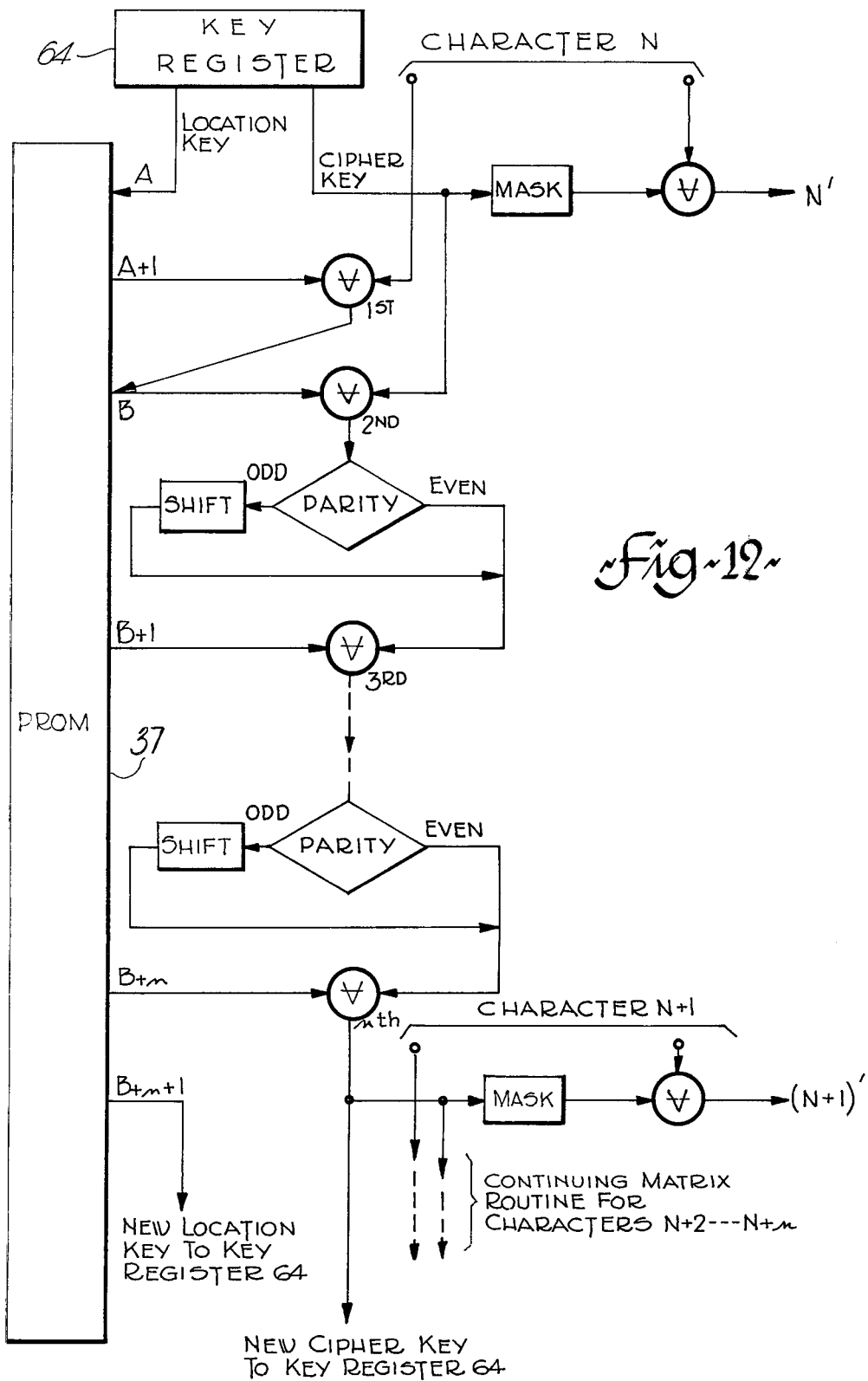
FIG. 12 is a detailed, functional diagram of encrypting software shown in FIG. 11.

FIGS. 10, 11 and 12 each represent a flow chart that describes the software of the present invention using symbols to represent operations. These flow charts indicate the input signals that must be read, the required processing and computations needed to generate ciphertext corresponding to cleartext and what output signals must be generated to permit the operation of the apparatus 10 in a uniform and logical manner. A program may be written from the flow charts herein to be described, such program achieving all of the objectives of the present invention. Taken alone, the flow charts thus constitute a complete disclosure of the invention.

FIG. 10 is a simplified overall view of a flow chart of the program that is loaded into the PROMs 37, and which uniquely characterizes the structural and operating characteristics of the apparatus 10. Initially, a stream of data and control characters generated at the terminal 12 are input to a first control character decision process represented by a block 60. The program is designed to pass control characters directly to the line modem 14. Control characters entering the block 60 will therefore pass to the left and on to the modem 14.

It will be observed that a control character path is also shown leading to a process control block 61. The process represented by the block 61 is responsive to the left-hand (<) and right-hand (>) delimiters and controls an encryption process represented by a block 62. In the event, therefore, that the block 60 receives a left-hand delimiter (<), the character (<) will be passed on to the line modem 14 and also to the block 61 which actuates the encryption process so that data characters following the left-hand delimiter (<) will pass out of the block 60 to the right and through the encryption process to a second control character decision block 63. In traversing this path, it will be understood that the encryption process transforms cleartext data characters into encrypted characters in accordance with a cipher key stored in a key register 64.

The ciphertext data in the block 63 is tested to determine if a control character has been generated in the encryption process. If no character has been generated by the encryption process, the character will pass to the left directly to the line modem 14. If, however, the encrypted character was transformed into a control character, it will pass to the right and will undergo transformation to an acceptable encrypted character, meaning one that is neither a control nor an editing character. This occurs in a character transformation process indicated by a block 65. The transformed character is then output to the line modem 14.

It will be recalled that a new key stream is used with each new line of cleartext to be encrypted. Also, individual lines of cleartext may be interrupted to encrypt sensitive portions thereof. Control characters are provided to enable the apparatus 10 to respond accordingly and each time such a character appears it not only is output to the line modem 14 but it is also input to the control block 61 to start and stop the encryption process and to initiate generation of a new key stream as required.

Considering next that the ciphertext data received by the line modem 14 has been transmitted to the system 11, the data is then reflected back by the system 11 to the terminal 12 to produce a cleartext printout of the transmitted message. As earlier discussed, this feature of the invention secures sensitive data portions of the data not only during transmission but also while it is stored in the memory of the system 11.

On its return from the modem 14, the data is input to a third control character decision process represented by a block 66 in order to separate the control characters from encrypted characters. All control characters pass to the right of the block 66 and go directly to the terminal 12. All other characters pass to the left to a transformed character decision process represented by a block 67. Conventionally encrypted characters pass to the right and are deciphered in a decryption process indicated at a block 68. It will be understood that decryption is under the control of the control block 61 which in turn is enabled by control characters issuing from the block 66. The reason for maintaining the control characters in cleartext form is now apparent since on return of the encrypted message these characters are necessary in the operation of the block 61 to provide decryption of the ciphertext. As in the case of encryption, decryption requires the same cipher key stored in the register 64 in order to return the ciphertext to its cleartext form. It will be understood that during the decryption process a new cipher key is generated and stored in the register 64 for the next following data that is to be deciphered.

In the block 67 a test is conducted to detect the transformed characters which then pass to the left and proceed through a reverse character transformation process, shown as a block 69, where each transformed character is returned to its encrypted form. Thereafter, these characters pass to the decryption process where they are returned to their cleartext form.

FIG. 11 is a more detailed flow chart of the software described in FIG. 10. Prior to describing the flow chart, reference to the following symbols and abbreviations that appear therein will enable a more thorough understanding of the program.

| FLAGS AND VARIABLES | |
| --- | --- |
| CHR | VARIABLE |
| ECF | ENCRYPTION FLAG |
| PCF | PROGRAM CONTROL FLAG |
| SYF | SYNCHRONIZATION FLAG |
| DTF | DOT FLAG |
| KPE | KEY POINTER ENCRYPT |
| KPN | KEY POINTER NONENCRYPT |
| EVC | ENCRYPTION VARIATION COUNTER |
| KYS | KEY SEED |
| KLS | KEY LOCATION SEED |
| SP | STACK POINTER |

| -continued | |
| --- | --- |
| SYC | SYNC COUNTER |
| | SUBROUTINES |
| DLY | DELAY |
| T:T | TRANSMIT TO TERMINAL |
| T:M | TRANSMIT TO MODEM |
| R:T | RECEIVE FROM TERMINAL |
| R:M | RECEIVE FROM MODEM |
| | FETCH KEY |
| | STORE KEY |
| REPLI | REVERSE REPLACEMENT |
| REPL | REPLACE |
| | MASK |
| | MATRIX ROUTINE |
| INT T | TERMINAL ROUTINE |
| INT M | MODEM ROUTINE |

Following the application of power to the apparatus 10, the microcomputer 24 is initialized by setting the various flags, and counters as shown. Note that the counter EVC is initialized to 006 (octal notation) taken from the PROM 37. Since the counter EVC determines the number of iterative steps that are performed in the course of the encryption method, following initiallization it is stored in RAM 33 because the count is decremented as encryption proceeds.

Seeds KLS and KYS represent addresses in PROM 37, their respective addresses being shown in octal notation in FIG. 11.

During initialization of the apparatus 10, the stack pointer SP is set to 200377 (octal notation), which is the RAM address used for the subroutine return addresses. The counter SYC is then started and continuously counts from 0 to 256, repeating the count until an interrupt is received which takes the microprocessor 30 out of the counting routine.

Assuming that the UART 22 is the interrupting device, the microprocessor 30 selects from the PROM 37 a subroutine R:T to receive data from the terminal 12. Given that the first input character is to be transmitted to the system 11 as cleartext, a test is first conducted to determine if the flag DTF has been set to '0'. If not, the program returns to counting by resetting the stack pointer SP. Since the dot flag DTF was set to '0' in the initiallizing step, the output from the DTF decision block is to the right followed by a test to ascertain the condition of the encryption flag ECF. The flag ECF was also set to '0' on initiallization so that the program continues to the left where a test is made for a backspace character (@). Knowing that the character tested is a data character and not a control character, the program passes to the right of the backspace decision block and on to the program control flag PCF which is set to '1'. The character is then output to the line modem in accordance with the subroutine T:M and the program returns to counting by reinitiallizing the stack pointer SP.

The transmitted data character is received by the computer in the system 11 and thereafter is reflected back via the modem 15 over the link 23 to the modem 14 as shown in FIG. 1. An interrupt is then generated which enables the microprocessor 30 to retrieve instructions from the PROM 37 permitting data input to the UART 25 to be read and processed. The instructions comprise a subroutine R:M.

The reflected cleartext data character is first tested to determine if it is one of the control characters indicated, e.g., >, CR, <, #, [, LF, and @. Being none of these, a test is performed to determine if the encryption flag ECF has been set to '0'. Since ECF='0', the received data character is output to the left of the ECF decision block to increment the key pointer nonencrypt counter KPN by '1'. Thereafter, a subroutine is initiated by which the character is transmitted to the terminal 12 as indicated by the block T:T. The next step in the routine is to reset the flag PCF to '0'. The program then returns to the stack pointer SP and the sync counter SYC resumes counting.

Consider next a control character in the form of a left-hand delimiter (<) generated at the terminal 12. As in the foregoing case of the cleartext character, the character (<) continues through to the modem 14 from which it is output to the system 11. Thereafter, the program returns to the idle mode and the sync counter SYC resumes counting. On reflection from the system 11 the character (<) is received by the modem 14. An interrupt follows, placing the microprocessor 30 into its Receive from Modem subroutine R:M. As in the case of the cleartext character, the character (<) is tested to determine if it is a control character. An affirmative output from the test sets the flag ECF to '1'. Thereafter, since the flag PCF was previously set to '1' on transmission, the output from the RCF decision block is to the right, leading to a second string of the program. In the sequence that follows, the sync flag SYF is set to '1' followed by the counter KPE being set to '0' which in turn is followed by the counter EVC being set to '006' (octal notation). The following subroutine T:T results in the character (<) being transmitted to the terminal 12. The flag PCF is then reset to '0' and the program continues to a Mask Sync subroutine where four characters or numbers generated in a psuedo random manner by the sync counter SYC are masked and processed to obviate the generation of either control or editing characters. The random characters are then delayed by a subroutine DLY to allow sufficient time for the modem 14, which was in a receive mode, to turn around to a transmit mode.

The program continues by testing the dot flag DTF. As the flag DTF is still set to '0', the program proceeds to test the condition of the flag ECF. Since the previously received character (<) sets the flag ECF to '1', the program then tests the random characters to ascertain if any are editing or control characters. Because the masking and processing steps preclude such characters, the program continues to the backspace (@) test and therefrom to the encryption subroutine. At this point, the microprocessor 30 fetches the cipher key stored in the PROM 37 and proceeds to encrypt the random characters according to Mask and Exclusive OR ($\forall$) subroutines. Following encryption a replace REPL subroutine is initiated in the event that any of the random characters were encrypted into an illegal form that includes control and editing characters. The flag PCF is then set to '1' and the encrypted random characters are output via the subroutine T:M to the modem 14 for transmission to the system 11. The program thereafter returns to its idle mode.

Following reflection from the system 11, the encrypted random characters are input to the UART 25 and are tested for the presence of control characters as hereinbefore described in connection with the reflected cleartext character. After the backspace character (@) test and the test that ascertains the condition of the ECF flag, which is presently set to '1', a further test is conducted to determine if a dot (.) has been received from the computer of the system 11. In the embodiment of FIG. 1 a dot character (.) is generated by the system 11 when it is ready to receive data from the terminal 10. In the present case the encrypted random characters are merely being reflected back and therefore a dot does not appear. Accordingly, the encrypted characters then enter into a decipher subroutine that comprises the subroutines Reverse Replacement REPLI, Fetch Key, Mask and Exclusive OR ($\forall$). Therefrom, the program continues to a subroutine shown as a Matrix Routine where a new cipher key is generated. The new key is then stored in RAM 33 by a subroutine shown as Store Key. The condition of the flag SYF is then tested. Being previously set to '1' the program follows to the right where the flag SYF is set to '0' and continues therefrom to set the flag PCF to '0'. It will be observed that the deciphered random characters are not printed out and that at this point the program is returned to its idle mode.

All characters that are now input to the apparatus 10, with the exception of control and editing characters, will be encrypted as in the case of the four random characters and sent out in ciphertext form for storage in the system 11. The program now provides that each reflected encrypted character after being deciphered in the manner described for the four random characters follows to the left of the flag SYF test since the flag SYF was previously set to '0'. Accordingly, the deciphered reflected characters pass to a first string of the program and are then transmitted to the terminal 12 in accordance with the subroutine T:T. Thereafter, the flag PCF is set to '0' and the program returns to its idle mode. Unlike the deciphered random characters which were not printed, the deciphered data characters are printed out at the terminal.

In the system described, each line of text is limited to a maximum of 80 characters. Data characters exceeding this number appear therefore in succeeding additional lines. In order to enable a line change, an operator at the terminal 12 will transmit a carriage return CR. Being a control character, CR is transmitted and reflected as cleartext. When received, the character is tested and identified at the CR decision block. The program then proceeds to the left to ascertain the state of the flag ECF. Since the apparatus 10 is still in the encryption mode, the flag remains set at '1' and the program proceeds to test the status of the flag PCF. It will be recalled that with each transmitted character the flag PCF is set to '1'. It will be seen therefore that the program follows to the right to set the flag DTF to '1'. The program then follows the first string which includes setting the flag SYF to '1', setting the counter KPE to '0', setting the counter EVC to '006', setting the counter KPN to '0' and then outputting the CR to the terminal via the subroutine T:T to perform the appropriate operation.

Assuming that the apparatus 10 is still in the encryption mode, and that the next character received from the terminal 12 is a data character to be encrypted, the encryption process and data transmision is followed as previously described. Prior to generation of the first encrypted character in the new line, the computer of the system 11 responds to the control character CR by replying with a dot (.). The received dot (.) is tested as may be seen in FIG. 11 and the program continues to the right to test the condition of the flag DTF. Since the flag DTF was previously set by the character CR to '1', the program continues to the right, resetting the flag DTF to '0' and then entering the second string of the program as shown. The dot (.) is then output to the terminal 12 by the subroutine T:T. Following this step of the program, the flag PCF is set to '0' and another group of four random characters are taken from the sync counter SYC and are transmitted to the system 11 as previously described. Thereafter, the reflected, encrypted random characters generate a new cipher key for the new line as previously described. The microprocessor 30 is now set to receive for encryption the first data character of the new line.

Data characters input at the terminal 12 continue to be encrypted by the apparatus 10 for as long as the encryption mode is maintained. Thus, each succeeding line of cleartext is converted to corresponding ciphertext. According to the foregoing description, a different cipher key stream is generated for each line of text. Since each cipher key stream has a period greater than that of each line of text, 80 characters, it is apparent that the periodicity of the key stream is never indicated. Furthermore, since each line of encrypted text is separately encoded, the occurrence of a momentary transmission loss will, at the most, result in the loss of one line and most likely would result in only a partial loss of that line. The system 10 thus has improved noise immunity.

The cipher keys for each new line are stored in the RAMs 33 to allow editing at the terminal 12. This feature permits erase functions of the type described and also provides an improvement in file management in that a file may be conveniently entered at any line. As previously described, both clear and encrypted text in mixed form may appear in a single line which gives the system 10 greater flexibility.

The contents KPE and KPN of predetermined addresses in PROM 37 are employed as counters to determine the number of characters that have been encrypted and nonencrypted respectively. Each counter is incremented as appropriate. Each counter is also decremented with each backspace (@). It will be noted, however, that when backspacing either cleartext or ciphertext, a backspace operation cannot go beyond a delimiter sign. Both the KPN and KPE counters are thus required to maintain a separate current count for nonencrypted and encrypted data characters.

An example of a backspace operation will be apparent by referring to FIG. 11 which graphically illustrates this portion of the program. Since the apparatus 10 is still in the encryption mode, consider that a transmitted backspace character (@) has been reflected from the computer of the system 11 and has undegone the various initial tests to which each received character is subjected. At the backspace (@) decision block, an affirmative output is followed and a test is then conducted to determine the status of the flag ECF. Since the flag ECF has been previously set to '1' the counter KPE is decremented by '1' which results in a reduction in the apparent number of encrypted characters. Furthermore, the program initiates the T:T subroutine. These effects are evident in the first line of Example 1.

In the event that the apparatus 10 was in the nonencryption mode, the counter KPN would have been decremented in a similar manner to produce a corresponding result in the local copy and in the system 11.

The apparatus 10 is taken out of the encryption mode by means of a right-hand delimiter character (>) sent out to the system 11 following the last encrypted character. When reflected from the system 11, the character (>) is subjected to an identification test and, having been identified, the program sets the flag ECF to '0' and continues to the first string to set the counter KPN to '0' and to initiate the T:T subroutine. The flag PCF is then set to '0' and the program returns the microprocessor 30 to its counting mode. Communications between the terminal 12 and the system 11 will now be processed in cleartext until input of the next left-hand delimiter character.

When a dot character (.) is received from the system 11, this character has to be distinguished to determine if it is merely a signal indicating to the operator to proceed with inputting data or if it is in fact an encrypted character that should be deciphered and printed. The program accomodates this requirement by testing the status of the flag DTF following the test which indicates the presence of the dot character (.).

In the encryption mode, following transmission of a carriage return CR, the computer of the system 11 responds with a reflected CR followed by the dot character (.). In the course of receiving the reflected CR the flag DTF is set to '1'. Under these circumstances the flag DTF status test is negative which steers the program to reset the flag DTF to '0' and to output the dot character (.) to the second string followed by initiation of the T:T subroutine which produces a printout. The flag PCF is thereafter set to '0' and a new set of four random characters is generated as previously discussed.

When the dot character (.) is received from the system 11 as an encrypted character in an information retrieval mode, it will be understood that the flag DTF is at '0'. Accordingly, an affirmative output in the status determining test of the flag DTF directs the program to initiate the decipher subroutine. At this time the flag SYF is also at '0', and when its status is tested an affirmative output directs the program to the first string where the subroutine T:T is initiated which produces a printout of the deciphered dot character (.).

In order to provide a more comprehensive description of the encryption subroutine briefly disclosed herein, the diagram of FIG. 12 will next be considered. It will be observed that FIG. 12 includes a cipher key register that comprises the PROM 37 which also forms a part of the register 64. The PROM stores the data field used for 'corporate' level encryption and is plugged in its memory socket at address 003000 (octal notation) within the apparatus 10. Storage capacity within the PROM 37 provides a total of $2^{(256 \times 8)} = 3.23 \times 10^{616}$ different cipher keys, each one yielding a different encryption. With a slight software change, which would be obvious to one skilled in the art having regard to the present disclosure, and by adding some input ports to the microprocessor 30, cipher keys could be entered by switch arrays, key pads and the like.

Recalling the operation of the second string of the program shown in the flow chart of FIG. 11, the four random characters are generated, masked, encrypted and transformed as necessary and then transmitted to the system 11. On reflection the encrypted random characters initiate the decipher routine followed by the Matrix routine that generates a cipher key for the next following data character to be encrypted. It will be further recalled that the current cipher key is stored in the RAM 33 to facilitate editing functions. Only current cipher keys are stored in RAM so that when starting a new line in which new cipher keys are generated, the previous cipher keys are erased.

Given that the four random characters are available for introduction into the Matrix routine, the KLS and KYS seeds, also referred to as origin seeds, are used to encrypt these random characters to generate a corresponding location key and cipher key at a translated origin in the PROM 37. All apparatus 10 within a system use the same KLS and KYS seeds so as to give a consistent starting point for all encryption processes. Use of four random characters prior to encryption of the first data character thus has the effect of transposing the origin for data encryption to some random point. This effect is extremely important to prevent code breaking by the 'Dear Sir' method. Although four characters are described in the current embodiment, it will be understood that any number of randomly generated characters may be used and would be apparent to one skilled in the art.

Having established a random origin in the PROM 37, a new cipher key is now availablle to be used in the encryption process for data characters. FIG. 12 illustrates the encryption processes for a character N followed by a character N+1. These characters may be located anywhere within a line of text. The microprocessor takes the new cipher key from the key register 64 and masks the first three most significant digits. The reason for this step is to preclude the possibility of generating an encrypted character that forms part of the group of illegal characters. Following the masking step, a first logical operation in the form of an Exclusive OR is performed on the masked cipher key, together with the data character N to be encrypted. The result of the Exclusive OR function is to transform the data character N to an encrypted character N' which is then passed to the character transformation process 65.

It is now required to establish the next cipher key in order to encrypt the following digitally encoded data character N+1. Initiating the method by which the next key is generated requires locating the translated location key origin in the Key Register 64, herein referred to as a first address A in the PROM 37. The address A is firstly incremented by '1' to generate a second address A+1. The contents of A+1 are then retrieved. An Exclusive OR operation is performed on the retrieved contents of the address A+1 and on the data character N to generate a first calculated character that represents an address B in the PROM 37. In the next step, the contents of the address B are taken and an Exclusive OR operation is performed with the translated cipher key to generate a second calculated character which is subjected to a parity test. In the event that the parity of the second calculated character is odd, the result is shifted to the left by one bit in response to this parity condition. If the parity condition is even, the second calculated character is unaltered.

The address B is then incremented by '1' to generate an address B+1 in the PROM 37. The contents of the address B+1 are retrieved and the Exclusive OR operation is performed thereon with either the second calculated character or its shifted counterpart to generate a third calculated character.

At this point, the address B+1 is successively incremented by '1' to generate a plurality of addresses in the PROM 37 and the procedure previously described is repeated. The last calculated character in the series, shown as the nth character, represents the cipher key for the second encoded data character N+1. The contents of B+n+1 represent the address of a location key in the PROM 37 from which the Matrix routine initiates the generation of a new cipher key for a third data character N+2.

The last three steps, parity check, shift or not, and Exclusive OR are repeated between two and twelve times. The number of times repeated depends on the position of the data character with respect to the previous left-hand delimiter, or a physical or logical data character line end. For the first character to be encrypted, the last three steps are repeated twelve times. For the second following character to be encrypted, the last three steps are repeated eleven times and so on until two times. Thereafter the encryption cycle is repeated. The counter EVC controls the encryption cycle which continues in the manner indicated until a new encryption key stream is initiated, as for a new line.

The effect of the origin translation and subsequent key stream generation is readily seen by comparing the second row with the fourth row of Example 5. Both rows are identical in cleartext but not in ciphertext. It will be noted that the second row of cleartext in the example is cyclic (the period is 2) which would imply the encrypted form also to be cyclic but at a longer period. Looking at the second row of the ciphertext, however, it will be seen that no period can be recognized. This has been achieved by making the encryption period substantially longer than the period of any line.

A comparison of the encryption and deciphering subroutines illustrated in FIG. 11 together with the following description will reveal the manner in which the ciphertext is restored to its cleartext form. Both subroutines utilize the same encryption key which is indicated by the common step of fetching the key. This step is then followed by the separate steps of masking and taking an Exclusive OR of predetermined digitally encoded data. Particular regard to FIG. 12 and its description shows clearly the manner in which the encryption algorithm proceeds.

The corresponding deciphering algorithm is similar. For example, the four random characters are used in both algorithms to establish the address A in the PROM 37. Even when the apparatus 10 is retrieving stored data from the system 11, each line of text is preceded by the four random characters which establish the cipher key and address A as in the encryption subroutine. The principal difference between the encryption and deciphering subroutines occurs in the order of digitally encoded data to be manipulated. Thus, in the encryption subroutine an Exclusive OR is taken of the masked cipher key and the data character N to produce the encrypted character N'. In the deciphering subroutine, the character N' is restored to N by taking an Exclusive OR of N' with the masked cipher key. Having established N, the iterative steps that comprise the Matrix routine are followed to establish the required addresses in the PROM 37 for deciphering each following encrypted character in the same manner.

The encryption and deciphering algorithms that have been described in regard to the flow charts of FIGS. 10, 11 and 12 are listed below as a series of sequential logical instructions. The instructions appear in three columns which represent, reading from left to right, the address in PROM 37 of each instruction, the HEX code identifying the instruction, and the mnemonic form of the instruction which is shown in the literature of the microprocessor 30. These instructions are grouped into specific subroutines that include (a) STORE KEY, (b) FETCH KEY, (c) MATRIX ROUTINE, (d) MASK, (e) REPL and (f) REPLI as follows:

|     |      |        |              |
| --- | ---- | ------ | ------------ |
| (a) |      |        | ;STORE KEY   |
|     | 005D | 3AAD80 | SK:LDA KPE   |
|     | 0060 | 3C     | INR A        |
|     | 0061 | 32AD80 | STA KPE      |
|     | 0064 | 6F     | MOV L,A      |
|     | 0065 | 2680   | MVI H,80H    |
|     | 0067 | 3AAB80 | LDA KSB1     |
|     | 006A | 77     | MOV M,A      |
|     | 006B | 7D     | MOV A,L      |
|     | 006C | C650   | ADI 50H      |
|     | 006E | 6F     | MOV L,A      |
|     | 006F | 3AAC80 | LDA KSB2     |
|     | 0072 | 77     | MOV M,A      |
|     | 0073 | C9     | RET          |
| (b) |      |        | ;FETCH KEY   |
|     | 0074 | 3AAD80 | FK:LDA KPE   |
|     | 0077 | 6F     | MOV L,A      |
|     | 0078 | 2680   | MVI H,80H    |
|     | 007A | 7E     | MOV A,M      |
|     | 007B | 32AB80 | STA KSB1     |
|     | 007E | 7D     | MOV A,L      |
|     | 007F | C650   | ADI 50H      |
|     | 0081 | 6F     | MOV L,A      |
|     | 0082 | 7E     | MOV A,M      |
|     | 0083 | 32AC80 | STA KSB2     |
|     | 0086 | C9     | RET          |
| (c) |      |        | ;MATRIX ROUTINE |
|     | 0087 | 3AAC80 | MR:LDA KSB2  |
|     | 008A | 6F     | MOV L,A      |
|     | 008B | 2C     | INR L        |
|     | 008C | 2608   | MVI H,08H    |
|     | 008E | 3AAA80 | LDA CHR      |
|     | 0091 | AE     | XRA M        |
|     | 0092 | 6F     | MOV L,A      |
|     | 0093 | 3AA980 | LDA EVC      |
|     | 0096 | 5F     | MOV E,A      |
|     | 0097 | 47     | MOV B,A      |
|     | 0098 | 3AAB80 | LDA KSB1     |
|     | 009B | AE     | MR2:XRA M    |
|     | 009C | E2A000 | JPO MR1      |
|     | 009F | 07     | RLC          |
|     | 00A0 | 2C     | MR1:INR L    |
|     | 00A1 | 05     | DCR B        |
|     | 00A2 | C29B00 | JNZ MR2      |
|     | 00A5 | 32AB80 | STA KSB1     |
|     | 00A8 | 7D     | MOV A,L      |
|     | 00A9 | 32AC80 | STA KSB2     |
|     | 00AC | 1D     | DCR E        |
|     | 00AD | 3E02   | MVI A,02H    |
|     | 00AF | BB     | CMP E        |
|     | 00B0 | 7B     | MOV A,E      |
|     | 00B1 | 32A980 | STA EVC      |
|     | 00B4 | C0     | RNZ          |
|     | 00B5 | 3E0A   | MVI A,0AH    |
|     | 00B7 | 32A980 | STA EVC      |
|     | 00BA | C9     | RET          |
| (d) |      |        | ;MASK        |
|     | 00BB | 21AB80 | MK:LXI H,KSB1 |
|     | 00BE | 7E     | MOV A,M      |
|     | 00BF | EEE0   | XRI 0E0H     |
|     | 00C1 | A6     | ANA M        |
|     | 00C2 | 32AF80 | STA MKB      |
|     | 00C5 | C9     | RET          |
| (e) |      |        | ;REPL.       |
|     | 00C6 | 3AAA80 | REPL:LDA CHR |
|     | 00C9 | FE3E   | CPI 3EH      |
|     | 00CB | 0601   | MVI B,01H    |
|     | 00CD | CA0201 | JZ REPLI     |
|     | 00D0 | FE5B   | CPI 5BH      |
|     | 00D2 | 0602   | MVI B,02H    |
|     | 00D4 | CA0201 | JZ REPLI     |
|     | 00D7 | FE3C   | CPI 3CH      |
|     | 00D9 | 0603   | MVI B,03H    |
|     | 00DB | CA0201 | JZ REPLI     |
|     | 00DE | FE23   | CPI 23H      |
|     | 00E0 | 060E   | MVI B,0EH    |
|     | 00E2 | CA0201 | JZ REPLI     |
|     | 00E5 | FE40   | CPI 40H      |
|     | 00E7 | 060F   | MVI B,0FH    |
|     | 00E9 | CA0201 | JZ REPLI     |
|     | 00EC | FE7F   | CPI 7FH      |
|     | 00EE | 0615   | MVI B,15H    |

-continued

|     |      |        |              |
| --- | ---- | ------ | ------------ |
|     | 00F0 | CA0201 | JZ REPLI     |
|     | 00F3 | FE22   | CPI 22H      |
|     | 00F5 | 0617   | MVI B,17H    |
|     | 00F7 | CA0201 | JZ REPLI     |
|     | 00FA | FE25   | CPI 25H      |
|     | 00FC | 0616   | MVI B,16H    |
|     | 00FE | CA0201 | JZ REPLI     |
|     | 0101 | C9     | RET          |
|     | 0102 | 78     | REPLI:MOV A,B |
|     | 0103 | 32AA80 | STA CHR      |
|     | 0106 | C9     | RET          |
| (f) |      |        | ;REPLI       |
|     | 0107 | 3AAA80 | RPLI:LDA CHR |
|     | 010A | FE01   | CPI 01H      |
|     | 010C | 063E   | MVI B,3BH    |
|     | 010E | CA4301 | JZ RPLI1     |
|     | 0111 | FE02   | CPI 02H      |
|     | 0113 | 065B   | MVI B,5BH    |
|     | 0115 | CA4301 | JZ RPLI1     |
|     | 0118 | FE03   | CPI 03H      |
|     | 011A | 063C   | MVI B,3CH    |
|     | 011C | CA4301 | JZ RPLI1     |
|     | 011F | FE0E   | CPI 0EH      |
|     | 0121 | 0623   | MUI B,23H    |
|     | 0123 | CA4301 | JZ RPLI1     |
|     | 0126 | FE0F   | CPI 0FH      |
|     | 0128 | 0640   | MVI B,40H    |
|     | 012A | CA4301 | JZ RPLI1     |
|     | 012D | FE15   | CPI 15H      |
|     | 012F | 067F   | MVI B,7FH    |
|     | 0131 | CA4301 | JZ RPLI1     |
|     | 0134 | FE17   | CPI 17H      |
|     | 0136 | 0622   | MVI B,22H    |
|     | 0138 | CA4301 | JZ RPLI1     |
|     | 013B | FE16   | CPI 16H      |
|     | 013D | 0625   | MVI B,25H    |
|     | 013F | CA4301 | JZ RPLI1     |
|     | 0142 | C9     | RET          |
|     | 0143 | 7B     | RPLI1:MOV A,B |
|     | 0144 | 32AA80 | STA CHR      |
|     | 0147 | C9     | RET          |

Having regard to the description and illustrations of the present invention, it will be apparent to those skilled in the art that variations thereof within the scope of the invention are readily feasible. Accordingly, the disclosed and illustrated embodiments herein should be considered as exemplary rather than restrictive of the invention which is defined in the accompanying claims.

What I claim is:

1. A past dependent method for selectively encrypting and deciphering digitally encoded data characters in a microcomputer having a read only memory for storing data words and operational instructions, a read/write memory for storing data, a microprocessor adapted to process data characters input thereto in an orderly and logical manner responsive to retrieved instructions, and bus means communicating the microprocessor with its memories, an input port and an output port, the method comprising the steps of:

(A) selecting a first origin having a predetermined address in a data field of the read only memory;

(B) translating the first origin to a second origin of the read only memory in response to at least one randomly generated character;

(C) storing the contents of the second origin in a key register in the read/write memory;

(D) retrieving the contents of said key register and performing a first logical operation with a cipher key thereof on a first data character input at the input port to transform said character into one of, a corresponding encoded encrypted and deciphered character at the output port;

(E) performing a variable sequence of iterative logical operations on the cipher key to generate a new key for transforming a succeeding encoded data character input at the input port, the number of iterative steps being determined by the position of the data character with respect to one of, a predetermined previously input control character and a previous physical or logical data character line end, comprising
(a) locating a predetermined first address in the read only memory corresponding to a location key of the retrieved contents of said key register,
(b) incrementing the first address by a predetermined number to generate a second address in the read only memory, and
(c) retrieving the contents of the second address and performing said first logical operation thereon with the first data character to generate a first calculated character representing a third address in the read only memory, and;
(F) storing the new key in the read/write memory.

2. A method as claimed in claim 1 wherein the iterative logical operations further comprise:
retrieving the contents of the third address and performing said first logical operation thereon with the cipher key to generate a second calculated character.

3. A method as claimed in claim 2 wherein the iterative logical operations further comprise:
testing the parity of the second calculated character and shifting same by at least one bit in response to a predetermined parity condition.

4. A method as claimed in claim 3 wherein the iterative logical operations further comprise:
incrementing the third address by said predetermined number to generate a fourth address in the read only memory.

5. A method as claimed in claim 4 wherein the iterative logical operations further comprise:
retrieving the contents of the fourth address and performing the first logical operation thereon and on one of, the second calculated character and the shifted counterpart thereof to generate a third calculated character.

6. A method as claimed in claim 5 wherein the iterative logical operations further comprise:
iteratively incrementing the fourth address by said predetermined number to generate a plurality of predetermined addresses in the read only memory.

7. A method as claimed in claim 6 wherein the iterative logical operations further comprise:
sequentially addressing individual ones of the iteratively incremented addresses in the read only memory, retrieving the contents of individual ones of the addresses in the read only memory, and performing the first logical operation on the contents of each address so addressed with a corresponding second calculated character or its shifted counterpart to generate a series of calculated characters, the last one of which representing the new key for the succeeding encoded data character, the number of said predetermined addresses in the read only memory and corresponding first logical operations being determined by the position of the data character with respect to one of, a next previous left-hand delimiter control character and the next previous physical or logical data character line end.

8. A method as claimed in claim 7 comprising the further steps of:
incrementing by one the last of the iteratively incremented addresses;
retrieving the contents thereof; and
storing same in the key register for use as a new location key in the read only memory when initiating the variable sequence of iterative logical operations on said new cipher key to generate a following new cipher key for the next succeeding encoded data character.

9. A method as claimed in claim 8 wherein the step (A) is preceded by the step of programming the read only memory with the data field, said field comprising a key having at least 2048 bits.

10. A method as claimed in claim 9 comprising the further step of storing in the read/write memory a current line of cipher keys for editing purposes when enciphering data characters, the microprocessor being responsive to a backspace control character for sequentially erasing the last stored cipher key for each occurring backspace control character.

11. A method as claimed in claim 10 comprising the further step of erasing the next previously stored line of cipher keys to accommodate the current line of keys.

12. A method as claimed in claim 11 wherein:
(1) the first logical operation is an Exclusive OR function;
(2) the first origin is translated to the second origin in response to four characters that are randomly generated;
(3) said predetermined number is one;
(4) the number of said predetermined addresses in the read memory have a cyclical variation of from twelve to two; and
(5) each second calculated character is shifted to the left by one bit in response to a parity odd condition.

13. A method as claimed in claim 12 wherein the first logical operation of the step (D) is preceded by masking the three most significant bits of the cipher key.

14. Microcomputer apparatus for selectively encrypting and deciphering digitally encoded data characters in a past dependent method, including a read only memory for storing data words and operational instructions, a read/write memory for storing data, a microprocessor adapted to process data characters input thereto in an orderly and logical manner, and bus means communicating the microprocessor with its memories, an input port and an output port, and comprising:
(A) means for selecting a first origin having a predetermined address in a data field of the read only memory;
(B) means for translating the first origin to a second origin of the read only memory in response to at least one randomly generated character;
(C) means for storing the contents of the second origin in a key register in the read/write memory;
(D) means for retrieving the contents of said key register and performing a first logical operation with a cipher key thereof on a first data character input at the input port to transform said character into one of, a corresponding encoded encrypted and deciphered character at the output port;
(E) means for performing a variable sequence of iterative logical operations on the cipher key to generate a new key for transforming a succeeding encoded data character input at the input port, the number of iterative steps being determined by the position of the data character with respect to one of, a predetermined previously input control character and a previous physical or logical data character line end, including means for
(a) locating a predetermined first address in the read only memory corresponding to a location key of the retrieved contents of said key register,
(b) incrementing the first address by a predetermined number to generate a second address in the read only memory, and
(c) retrieving the contents of the second address and performing said first logical operation thereon with the first data character to generate a first calculated character representing a third address in the read only memory, and;
(F) means for storing the new key in the read/write memory.

15. Apparatus as claimed in claim 14 wherein the means for performing the variable sequence of iterative logical operations on the cipher key to generate a new key further includes means for retrieving the contents of the third address and performing said first logical operation thereon with the cipher key to generate a second calculated character.

16. Apparatus as claimed in claim 15 further including means for testing the parity of the second calculated character and shifting same by at least one bit in response to a predetermined parity condition.

17. Apparatus as claimed in claim 16 further including means for incrementing the third address by said predetermined number to generate a fourth address in the read only memory.

18. Apparatus as claimed in claim 17 further including means for retrieving the contents of the fourth address and performing the first logical operation thereon and on one of, the second calculated character and the shifted counterpart thereof to generate a third calculated character.

19. Apparatus as claimed in claim 18 further including means for iteratively incrementing the fourth address by said predetermined number to generate a plurality of predetermined addresses in the read only memory.

20. Apparatus as claimed in claim 19 further including means for sequentially addressing individual ones of the iteratively incremented addresses in the read only memory, retrieving the contents of individual ones of the addresses in the read only memory, and performing the first logical operation on the contents of each address so addressed with a corresponding second calculated character or its shifted counterpart to generate a series of calculated characters, the last one of which representing the new key for the succeeding encoded data character, the number of said predetermined addresses in the read only memory and corresponding first logical operations being determined by the position of the data character with respect to one of, a next previous left-hand delimiter control character and the next previous physical or logical data character line end.

21. Apparatus as claimed in claim 20 further including:
means for incrementing by one the last of the iteratively incremented addresses;
means for retrieving the contents thereof; and
means for storing same in the key register for use as a new location key in the read only memory when initiating the variable sequence of iterative logical operations on said new cipher key to generate a following new cipher key for the next succeeding encoded data character.

22. Apparatus as claimed in claim 21 further comprising means for programming the read only memory with the data field, said field comprising a key having at least 2048 bits.

23. Apparatus as claimed in claim 22 further comprising means for storing in the read/write memory a current line of cipher keys for editing purposes when enciphering data characters, and wherein the microprocessor is responsive to a backspace control character for sequentially erasing the last stored cipher key for each occurring backspace control character.

24. Apparatus as claimed in claim 23 further comprising means for erasing the next previously stored line of cipher keys to accommodate the current line of keys.

25. Apparatus as claimed in claim 24 wherein:
(1) the first logical operation is an Exclusive OR function;
(2) the first origin is translated to the second origin in response to four characters that are randomly generated;
(3) said predetermined number is one;
(4) the number of said predetermined addresses in the read memory have a cyclical variation of from twelve to two; and
(5) each second calculated character is shifted to the left by one bit in response to a parity odd condition.

26. Apparatus as claimed in claim 25 further comprising means for masking the three most significant bits of the cipher key prior to performing said first logical operation on the first data character.

27. Apparatus as claimed in claim 26, further comprising:
first I/O communication interface means communicating the input port with a data terminal;
second I/O communication interface means comunicating the output port with a data link modem; and
generator means coupled to the microprocessor and the interface means and applying timing signals thereto for processing the data characters in said orderly and logical manner.

28. Apparatus as claimed in claim 27, further comprising:
interrupt means coupled to said interface means and the microprocessor for establishing a predetermined priority interrupt therebetween.

29. Apparatus as claimed in claim 28 wherein the generator means comprise:
a crystal controlled clock generator having a plurality of timing outputs; and
a baud rate generator coupled to a predetermined output of the clock generator and controlled thereby to generate a plurality of baud rates that control the rate of operation of the interface means.

30. Apparatus as claimed in claim 29, further comprising encryption variation counter means for establishing the number of iterative steps, the steps having a cyclical variation of from twelve to two.

* * * * *